US009961677B2

United States Patent
Zhang et al.

(10) Patent No.: US 9,961,677 B2
(45) Date of Patent: May 1, 2018

(54) METHOD FOR TRANSMITTING DOWNLINK CONTROL INFORMATION, METHOD FOR DETERMINING A SEARCH SPACE AND APPARATUSES THEREOF

(71) Applicant: FUJITSU LIMITED, Kawasaki-shi, Kanagawa (JP)

(72) Inventors: Jian Zhang, Beijing (CN); Yi Wang, Beijing (CN); Yi Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 346 days.

(21) Appl. No.: 14/801,996

(22) Filed: Jul. 17, 2015

(65) Prior Publication Data

US 2015/0327223 A1 Nov. 12, 2015

Related U.S. Application Data

(63) Continuation of application No. PCT/CN2013/070652, filed on Jan. 18, 2013.

(51) Int. Cl.
*H04W 72/04* (2009.01)
*H04L 5/00* (2006.01)
(Continued)

(52) U.S. Cl.
CPC ....... *H04W 72/042* (2013.01); *H04J 11/0086* (2013.01); *H04L 5/001* (2013.01); *H04W 48/12* (2013.01); *H04W 48/16* (2013.01)

(58) Field of Classification Search
CPC ... H04W 48/12; H04W 48/16; H04W 72/042; H04L 5/001; H04J 11/0086
(Continued)

(56) References Cited

U.S. PATENT DOCUMENTS 9,252,918 B2 * 2/2016 Nory .................. H04L 1/0045
2013/0003639 A1 * 1/2013 Noh .................... H04L 5/0053
370/312
2013/0028108 A1 1/2013 Wu et al.

FOREIGN PATENT DOCUMENTS

CN 101699901 A 4/2010
CN 101848483 A 9/2010
(Continued)

OTHER PUBLICATIONS

International Search Report issued for corresponding International Patent Application No. PCT/CN2013/070652, dated Oct. 31, 2013, with an English translation.

*Primary Examiner* — Ricky Ngo
*Assistant Examiner* — Richard Chang
(74) *Attorney, Agent, or Firm* — Myers Wolin, LLC

(57) ABSTRACT

A method for determining a search space, method for detecting downlink control information and apparatuses thereof. The method for determining a search space includes: determining eCCEs occupied by ePDCCH candidates in each carrier according to a first offset, a second offset and other related parameters; wherein the first offset denotes an offset of adjusting the eCCEs occupied by ePDCCH candidates in the same carrier in different eREG groups, and the second offset denotes an offset used for coordinating collision occurs among the eCCEs occupied by ePDCCH candidates in different carriers. In a case of cross-carrier, in configuring a search space, the first offset and the second offset are introduced to avoid collision between the ePDCCHs of the CCs as possible and avoid the ePDCCH candidates in each of the CCs from falling into the same eREG group as possible, thereby solving the problems in the prior art.

12 Claims, 14 Drawing Sheets

(51) Int. Cl.
*H04J 11/00* (2006.01)
*H04W 48/12* (2009.01)
*H04W 48/16* (2009.01)

(58) Field of Classification Search
USPC ........................................................ 370/312
See application file for complete search history.

(56) References Cited

FOREIGN PATENT DOCUMENTS

CN           102594537 A    7/2012
WO      2014/111805 A1    7/2014

* cited by examiner

METHOD FOR TRANSMITTING DOWNLINK CONTROL INFORMATION, METHOD FOR DETERMINING A SEARCH SPACE AND APPARATUSES THEREOF

CROSS REFERENCE TO RELATED APPLICATIONS

This application is a continuation application of International Application PCT/CN2013/070652 filed on Jan. 18, 2013, the entire contents of which are incorporated herein by reference.

TECHNICAL FIELD

The present disclosure relates to the field of communications, especially to control information transmission technologies, and in particular to a method for transmitting downlink control information, method for determining a search space and apparatuses thereof.

BACKGROUND

A physical downlink control channel (PDCCH) carries control information, such as downlink transmission allocation, uplink transmission grant, power control, paging, system information, and random access, etc.

A PDCCH consists of control channel elements (CCEs), and the number of the contained CCEs is defined as an aggregation level (AL). User equipment (UE) demodulates the PDCCH in a manner of blind detecting, and for each aggregation level, performs demodulation attempts on multiple possible PDCCH candidates.

A relationship between an aggregation level of a PDCCH and the number of CCEs and the number of PDCCH candidates needing to be detected is as shown in Table 1. All positions where the PDCCH possibly appears are referred to as search spaces.

TABLE 1

Number of CCEs and number of candidates to which different aggregation levels of a PDCCH correspond

| Aggregation levels of a PDCCH | Number of CCEs | Number of PDCCH candidates |
|---|---|---|
| AL1 | 1 | 6 |
| AL2 | 2 | 6 |
| AL4 | 4 | 2 |
| AL8 | 8 | 2 |

FIG. 1 is a schematic diagram of a search space of a PDCCH. As shown in FIG. 1, 0~(E−1) denote all CCE indices in an area of the PDCCH. For a certain aggregation level (in the following formulae, an aggregation level is denoted by "L"), a starting CCE index of any PDCCH is always an integral multiple of the L, and all PDCCH candidates are arranged consecutively.

In order to meet demands of LTE-advanced (LTE-A) for new scenarios, such as a heterogeneous network, coordinated multiple points, and carrier aggregation, etc., a control channel is also enhanced in LTE-A, which is referred to as an enhanced physical downlink control channel (ePDCCH).

An ePDCCH is transmitted in an area of a physical downlink shared channel (PDSCH), and is configured taking an ePDCCH set as a unit. For example, an ePDCCH set is currently defined as N physical resource block pairs (PRB pairs); where, N=2, 4, 8, and each physical resource block pair may be divided into 2 or 4 enhanced CCEs (eCCEs). Each ePDCCH set carries centralized ePDCCHs or carries distributed ePDCCHs. The centralized ePDCCHs occupy neighboring PRB pairs in a frequency domain, and their search spaces are defined in the ePDCCH set.

FIG. 2 is an example of a search space of centralized ePDCCHs when an aggregation level L=1. As shown in FIG. 2, an ePDCCH set where the search space is present contains N=4 PRB pairs, each PRB pair containing 4 eCCEs, and a number of ePDCCH candidates is 4. A principle of design of a search space of centralized ePDCCHs lies in distributing ePDCCH candidates in a range in the frequency domain as wide as possible, so as to obtain a frequency selectivity scheduling gain.

In a carrier aggregation (CA) scenario, a search space needs to provide support to cross-carrier scheduling; that is, control information on multiple component carriers (CCs) is transmitted in control channel resources of a current serving cell. For a search space of a PDCCH with an aggregation level L in Rel. 8, a CCE occupied by a PDCCH candidate with an index m may be obtained by using the formula below:

$$CCE(m, i) = L\left\{(Y_k + m + M \cdot n_{CI}) \bmod \left\lfloor \frac{N_{CCE}}{L} \right\rfloor \right\} + i. \quad (1)$$

In Formula (1), m denotes a PDCCH candidate index, i denotes an eCCE index in the candidate m, m=0, ..., M−1, i=0, 1, ..., L−1, M denotes a total number of candidates needing to be detected by UE in a blind manner, $Y_k$ is obtained by a Hash function and is related to a cell ratio network temporary identifier (C-RNTI) of the UE and a subframe number, $N_{CCE}$ denotes a total number of the CCEs contained in a PDCCH area, and $n_{CI}$=0, ..., $N_{CC}$−1 is used to identify CCs that are scheduled, $N_{CC}$ denoting a total number of the CCs.

FIG. 3 shows a calculation result obtained by using Formula (1) when the number of CCs is 2 and L=1 (L=1 PDCCH cross-carrier scheduled). As shown in FIG. 3, without loss of generality, it is assumed here that $Y_k$=0. It can be seen that PDCCH candidates of different CCs, i.e. CC0 and CC1, occupy CCE resources that are not overlapped each other.

For centralized ePDCCHs, in case of cross-carrier scheduling, an ideal principle of design of it should keep that ePDCCH candidates of different CCs are not overlapped each other, and at the same time, the ePDCCH candidates of each CC should be ensured to be distributed in a frequency range of a whole ePDCCH set as possible. On the basis of the single CC result in FIG. 2, a search space in cross-carrier scheduling may be obtained by using Formula (2) below (it turns back to a single CC scenario when $n_{CI}$=0):

$$eCCE(m, i) = L\left\{\left(Y_k + \left\lfloor \frac{m \cdot N_{eCCE}}{L \cdot M} + \frac{n_{CI} \cdot N_{eCCE}}{L \cdot M \cdot N_{CC}} \right\rfloor\right) \bmod \left\lfloor \frac{N_{eCCE}}{L} \right\rfloor \right\} + i. \quad (2)$$

In Formula (2), meanings and values of m, i, L, $Y_k$, M, $n_{CI}$ and $N_{CC}$ are as described above, which shall not be described herein any further, and $N_{eCCE}$ denotes a total number of the eCCEs contained in the ePDCCH set.

FIG. 4 is a schematic diagram of positions (ePDCCH cross-carrier scheduled) of ePDCCH candidates obtained by using Formula (2) when L=1. As shown in FIG. 4, ePDCCH-related configuration is: an ePDCCH set contains N=4 physical resource block pairs, each physical resource block pair containing 4 eCCEs, an aggregation level L=1, the number of the ePDCCH candidates is M=4, there are total 2 CCs, and $Y_k$=0.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In a multi-carrier scenario, using Formula (2) to determine a search space of an ePDCCH cannot utilize resources efficiently. Furthermore, use of the above method will cause ePDCCH candidates to fall within identical enhanced resource element groups (eREGs), and a problem of collision between ePDCCH candidates of different carriers may also exist. No efficient method for solving the above problems exists till now.

In order to solve the above problems, embodiments of the present disclosure provide a method for transmitting downlink control information, method for determining a search space and apparatuses thereof, which may solve the above problems.

According to a first aspect of the embodiments of the present disclosure, there is provided a method for determining a search space, including: determining enhanced control channel elements (eCCEs) occupied by enhanced physical downlink control channel (ePDCCH) candidates in each carrier according to an aggregation level of an ePDCCH and a total number of candidates, the number of eCCEs contained in an ePDCCH set and a parameter related to a cell-radio network temporary identifier (C-RNTI) of UE and a subframe number; wherein following formula is used in calculation:

$$eCCE(m,i) = L\left\{\left(Y_k + \left\lfloor\frac{m \cdot N_{eCCE}}{L \cdot M}\right\rfloor + n_{CI}\right)\bmod\left\lfloor\frac{N_{eCCE}}{L}\right\rfloor\right\} + i;$$

where, m denotes an ePDCCH candidate index, m=0, . . . , M−1, M denotes a total number of candidates needing to be detected by the UE in a blind manner, i=0, 1, . . . , L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$=0, 1, . . . , $N_{CC}$−1 denotes scheduled carriers, and $N_{CC}$ denotes a total number of the carriers.

According to a second aspect of the embodiments of the present disclosure, there is provided a method for determining a search space, including:

determining eCCEs occupied by ePDCCH candidates in each carrier according to a first offset, a second offset and other related parameters;

wherein the first offset denotes an offset of adjusting the eCCEs occupied by ePDCCH candidates in the same carrier in different eREG groups, and the second offset denotes an offset used for coordinating collision occurs among the eCCEs occupied by ePDCCH candidates in different carriers;

and the related parameters include: an aggregation level of the ePDCCH and a total number of candidates, the number of the eCCEs contained in an ePDCCH set, a parameter related to a C-RNTI of UE and a subframe number, and the number of eCCEs contained in each physical resource block pair.

According to a third aspect of the embodiments of the present disclosure, there is provided a method for determining a search space, including:

determining eCCEs occupied by ePDCCH candidates in each carrier in a manner as below:

$$eCCE(m,i) = N_{eCCERB}\left\lfloor\frac{A}{N_{eCCERB}}\right\rfloor +$$

$$L \cdot \left(\frac{A}{L} + \left\lfloor\frac{A}{N_{eCCERB} \cdot \lceil N \cdot L/N_{eCCERB}\rceil}\right\rfloor\right)\bmod\left(\frac{N_{eCCERB}}{L} + i;\right.$$

$$\text{where, } A = L\left\{\left(Y_k + \left\lfloor\frac{m \cdot N_{eCCE}}{L \cdot M} + \frac{n_{CI} \cdot N_{eCCE}}{L \cdot M \cdot N_{CC}}\right\rfloor\right)\bmod\left\lfloor\frac{N_{eCCE}}{L}\right\rfloor\right\}, \text{ or}$$

$$A = L\left\{\left(Y_k + \left\lfloor\frac{m \cdot N_{eCCE}}{L \cdot M}\right\rfloor + n_{CI}\right)\bmod\left\lfloor\frac{N_{eCCE}}{L}\right\rfloor\right\};$$

and where, m denotes an ePDCCH candidate index, m=0, . . . , M−1, M denotes a total number of candidates needing to be detected by UE in a blind manner, i=0, 1, . . . , L−1 denotes an eCCE index in a candidate with an index of m, L denotes an aggregation level, $Y_k$ denotes a parameter related to a C-RNTI of the UE and a subframe number, $N_{eCCE}$ denotes a total number of eCCEs contained in an ePDCCH set, $n_{CI}$ denotes scheduled carriers, $n_{CI}$=0, 1, . . . , $N_{CC}$−1, $N_{CC}$ denotes a total number of carriers, and $N_{eCCERB}$ denotes the number of eCCEs contained in each physical resource block pair.

According to a fourth aspect of the embodiments of the present disclosure, there is provided a method for determining a search space, including:

determining eCCEs occupied by ePDCCH candidates in each carrier in a manner as below:

$$eCCE(m,i) =$$

$$N_{eCCERB} \cdot B + L \cdot \left(m - m_{min} + \left\lfloor\frac{B}{\lceil N \cdot L/N_{eCCERB}\rceil}\right\rfloor + n_{CI}\left\lceil\frac{M}{N}\right\rceil + Y_k\right);$$

$$\bmod\left\lfloor\frac{N_{eCCERB}}{L}\right\rfloor + i$$

$$\text{where, } B = L_{RB}\left\{\left(Y_k + \left\lfloor\frac{m \cdot N}{L_{RB} \cdot M}\right\rfloor + \left\lfloor\frac{n_{CI} \cdot N}{L_{RB} \cdot M \cdot N_{CC}}\right\rfloor\right)\bmod\left\lfloor\frac{N}{L_{RB}}\right\rfloor\right\}, \text{ or}$$

$$B = L_{RB}\left\{\left(Y_k + \left\lfloor\frac{m \cdot N}{L_{RB} \cdot M}\right\rfloor + \left\lfloor\frac{n_{CI} \cdot L}{L_{RB} \cdot N_{eCCERB}}\right\rfloor\right)\bmod\left\lfloor\frac{N}{L_{RB}}\right\rfloor\right\};$$

and where, m denotes an ePDCCH candidate index, m=0, . . . , M−1, M denotes a total number of candidates needing to be detected by UE in a blind manner, B denotes an index of a PRB pair, and $m_{min}$ denotes a minimum value of all the m that falls within a PRB pair with an index of B;

and i=0, 1, . . . , L−1 denotes an eCCE index in a candidate with an index of m, L denotes an aggregation level, $Y_k$ denotes a parameter related to a C-RNTI of the UE and a subframe number, $n_{CI}$ denotes scheduled carriers, $n_{CI}$=0, 1, . . . , $N_{CC}$−1, $N_{CC}$ denotes a total number of carriers, N denotes the number of physical resource block pairs, $N_{eCCERB}$ denotes the number of eCCEs contained in each physical resource block pair, and $$L_{RB} = \left\lceil \frac{L}{N_{eCCERB}} \right\rceil$$

denotes the number of physical resource block pairs occupied by candidates with an aggregation level L.

According to a fifth aspect of the embodiments of the present disclosure, there is provided a method for determining a search space, including:

determining eCCEs occupied by ePDCCH candidates in each carrier in a manner as below:

$$eCCE(m, i) = N_{eCCERB} \cdot B + L \cdot \left(m + n_{CI} \left\lceil \frac{M}{N} \right\rceil + Y_k \right) \mod \left\lfloor \frac{N_{eCCERB}}{L} \right\rfloor + i;$$

$$\text{where, } B = L_{RB} \left\{ \left( \left\lceil \frac{Y_k}{N_{eCCERB}} \right\rceil + \left\lfloor \frac{m \cdot N}{L_{RB} \cdot M} \right\rfloor + \left\lfloor \frac{n_{CI} \cdot L}{L_{RB} \cdot N_{eCCERB}} \right\rfloor \right) \mod \left\lfloor \frac{N}{L_{RB}} \right\rfloor \right\}.$$

According to a sixth aspect of the embodiments of the present disclosure, there is provided a method for transmitting downlink control information, including:

determining a search space by using the method as claimed in any one of the first to the fifth aspects; and mapping enhanced physical downlink control information into the search space and transmitting to UE.

According to a seventh aspect of the embodiments of the present disclosure, there is provided a method for detecting downlink control information, including:

detecting enhanced physical downlink control information in a search space; wherein the search space is determined by using the method as described in one of the first to the fifth aspects.

According to an eighth aspect of the embodiments of the present disclosure, there is provided an apparatus for determining a search space, including: a first determining unit configured to determine eCCEs occupied by ePDCCH candidates in each carrier according to an aggregation level of an ePDCCH and a total number of candidates, the number of eCCEs contained in an ePDCCH set and a parameter related to an C-RNTI and a subframe number of UE; wherein following formula is used in calculation:

$$eCCE(m, i) = L \left\{ \left(Y_k + \left\lfloor \frac{m \cdot N_{eCCE}}{L \cdot M} \right\rfloor + n_{CI} \right) \mod \left\lfloor \frac{N_{eCCE}}{L} \right\rfloor \right\} + i;$$

where, m denotes an ePDCCH candidate index, m=0, . . . , M−1, M denotes a total number of candidates needing to be detected by the UE in a blind manner, i=0, 1, . . . , L−1 denotes an eCCE index in a candidate with an index of m, L denotes the aggregation level, $Y_k$ denotes a parameter related to the C-RNTI of the UE and the subframe number, $N_{eCCE}$ denotes a total number of eCCEs contained in the ePDCCH set, $n_{CI}$=0, 1, . . . , $N_{CC}$−1 denotes scheduled carriers, and $N_{CC}$ denotes a total number of the carriers.

According to a ninth aspect of the embodiments of the present disclosure, there is provided an apparatus for determining a search space, including: a second determining unit configured to determine eCCEs occupied by ePDCCH candidates in each carrier according to a first offset, a second offset and other related parameters;

wherein the first offset denotes an offset of adjusting the eCCEs occupied by ePDCCH candidates in the same carrier in different eREG groups, and the second offset denotes an offset used for coordinating collision occurs among the eCCEs occupied by ePDCCH candidates in different carriers;

and the related parameters include: an aggregation level of the ePDCCH and a total number of candidates, the number of eCCEs contained in an ePDCCH set, a parameter related to a C-RNTI of UE and a subframe number, and the number of eCCEs contained in each physical resource block pair.

According to a tenth aspect of the embodiments of the present disclosure, there is provided an apparatus for determining a search space, including: a third determining unit configured to determine eCCEs occupied by ePDCCH candidates in each carrier in a manner as below:

$$eCCE(m, i) = N_{eCCERB} \left\lfloor \frac{A}{N_{eCCERB}} \right\rfloor +$$

$$L \cdot \left( \frac{A}{L} + \left\lfloor \frac{A}{N_{eCCERB} \cdot \lceil N \cdot L/N_{eCCERB} \rceil} \right\rfloor \right) \mod \left( \frac{N_{eCCERB}}{L} \right) + i;$$

$$\text{where, } A = L \left\{ \left(Y_k + \left\lfloor \frac{m \cdot N_{eCCE}}{L \cdot M} + \frac{n_{CI} \cdot N_{eCCE}}{L \cdot M \cdot N_{CC}} \right\rfloor \right) \mod \left\lfloor \frac{N_{eCCE}}{L} \right\rfloor \right\}, \text{ or}$$

$$A = L \left\{ \left(Y_k + \left\lfloor \frac{m \cdot N_{eCCE}}{L \cdot M} \right\rfloor + n_{CI} \right) \mod \left\lfloor \frac{N_{eCCE}}{L} \right\rfloor \right\};$$

and where, m denotes an ePDCCH candidate index, m=0, . . . , M−1, M denotes a total number of candidates needing to be detected by UE in a blind manner, i=0, 1, . . . , L−1 denotes an eCCE index in a candidate with an index of m, L denotes an aggregation level, $Y_k$ denotes a parameter related to a C-RNTI of the UE and a subframe number, $N_{eCCE}$ denotes a total number of eCCEs contained in an ePDCCH set, $n_{CI}$ denotes scheduled carriers, $n_{CI}$=0, 1, . . . , $N_{CC}$−1, $N_{CC}$ denotes a total number of carriers, and $N_{eCCERB}$ denotes the number of eCCEs contained in each physical resource block pair.

According to an eleventh aspect of the embodiments of the present disclosure, there is provided an apparatus for determining a search space, including: a fourth determining unit configured to determine eCCEs occupied by ePDCCH candidates in each carrier in a manner as below:

$$eCCE(m, i) =$$

$$N_{eCCERB} \cdot B + L \cdot \left(m - m_{min} + \left\lfloor \frac{B}{\lceil N \cdot L/N_{eCCERB} \rceil} \right\rfloor + n_{CI} \left\lceil \frac{M}{N} \right\rceil + Y_k \right);$$

$$\mod \left\lfloor \frac{N_{eCCERB}}{L} \right\rfloor + i$$

$$\text{where, } B = L_{RB} \left\{ \left(Y_k + \left\lfloor \frac{m \cdot N}{L_{RB} \cdot M} \right\rfloor + \left\lfloor \frac{n_{CI} \cdot N}{L_{RB} \cdot M \cdot N_{CC}} \right\rfloor \right) \mod \left\lfloor \frac{N}{L_{RB}} \right\rfloor \right\}, \text{ or}$$

$$B = L_{RB} \left\{ \left(Y_k + \left\lfloor \frac{m \cdot N}{L_{RB} \cdot M} \right\rfloor + \left\lfloor \frac{n_{CI} \cdot L}{L_{RB} \cdot N_{eCCERB}} \right\rfloor \right) \mod \left\lfloor \frac{N}{L_{RB}} \right\rfloor \right\};$$

and where, m denotes an ePDCCH candidate index, m=0, . . . , M−1, M denotes a total number of candidates needing to be detected by UE in a blind manner, B denotes an index of a PRB pair, and $m_{min}$ denotes a minimum value of all the m falling within a PRB pair with an index of B;

and i=0, 1, . . . , L−1 denotes an eCCE index in a candidate with an index of m, L denotes an aggregation level, $Y_k$ denotes a parameter related to a C-RNTI of the UE and a subframe number, $n_{CI}$ denotes scheduled carriers, $n_{CI}$=0, 1, . . . , $N_{CC}$−1, $N_{CC}$ denotes a total number of carriers, N denotes the number of physical resource block pairs, $N_{eCCERB}$ denotes the number of eCCEs contained in each physical resource block pair, and $$L_{RB} = \left\lceil \frac{L}{N_{eCCERB}} \right\rceil$$

denotes the number of physical resource block pairs occupied by candidates with an aggregation level L.

According to a twelfth aspect of the embodiments of the present disclosure, there is provided an apparatus for determining a search space, including: a sixth determining unit configured to determine eCCEs occupied by ePDCCH candidates in each carrier in a manner as below:

$$eCCE(m, i) = N_{eCCERB} \cdot B + L \cdot \left(m + n_{CI}\left\lceil\frac{M}{N}\right\rceil + Y_k\right) \bmod \left\lceil\frac{N_{eCCERB}}{L}\right\rceil + i;$$

$$\text{where, } B = L_{RB}\left\{\left(\left\lceil\frac{Y_k}{N_{eCCERB}}\right\rceil + \left\lfloor\frac{m \cdot N}{L_{RB} \cdot M}\right\rfloor + \left\lfloor\frac{n_{CI} \cdot L}{L_{RB} \cdot N_{eCCERB}}\right\rfloor\right) \bmod \left\lfloor\frac{N}{L_{RB}}\right\rfloor\right\}.$$

According to a thirteenth aspect of the embodiments of the present disclosure, there is provided an apparatus for transmitting downlink control information, including:

a fifth determining unit configured to determine a search space of enhance physical downlink control information, which is the apparatus as described in one of the eighth to the twelfth aspects; and an information transmitting unit configured to map the enhanced physical downlink control information into the search space and transmit to UE.

According to a fourteenth aspect of the embodiments of the present disclosure, there is provided a base station, including the apparatus as described in one of the eighth to the twelfth aspects.

According to a fifteenth aspect of the embodiments of the present disclosure, there is provided a base station, including the apparatus as described in the thirteenth aspect.

According to a sixteenth aspect of the embodiments of the present disclosure, there is provided an apparatus for detecting downlink control information, including:

a search space determining unit configured to determine a search space of an ePDCCH information; wherein the search space determining unit includes the apparatus as described in the eighth to the twelfth aspects; and a detecting unit configured to detect an ePDCCH in the search space.

According to a seventeenth aspect of the embodiments of the present disclosure, there is provided UE, including the apparatus as described in one of the eighth to the twelfth aspects, or including the apparatus as described in the sixteenth aspect.

According to an eighteenth aspect of the embodiments of the present disclosure, there is provided a communication system, including a base station, the base station being the base station as described in the fourteenth or the fifteenth aspect.

According to a aspect of the embodiments of the present disclosure, there is provided a computer-readable program, wherein when the program is executed in an apparatus for determining a search space, a base station or UE, the program enables a computer to carry out the method for determining a search space as described in one of the first to the fifth aspects in the apparatus for determining a search space, the base station or the UE.

According to a twentieth aspect of the embodiments of the present disclosure, there is provided a storage medium in which a computer-readable program is stored, wherein the computer-readable program enables a computer to carry out the method for determining a search space as described in one of the first to the fifth aspects in an apparatus for determining a search space or a base station.

According to a twenty-first aspect of the embodiments of the present disclosure, there is provided a computer-readable program, wherein when the program is executed in an apparatus for transmitting downlink control information or a base station, the program enables a computer to carry out the method for transmitting downlink control information as described in the sixth aspect in the apparatus for transmitting downlink control information or the base station.

According to a twenty-second aspect of the embodiments of the present disclosure, there is provided a storage medium in which a computer-readable program is stored, wherein the computer-readable program enables a computer to carry out the method for transmitting downlink control information as described in the sixth aspect in an apparatus for transmitting downlink control information or a base station.

According to a twenty-third aspect of the embodiments of the present disclosure, there is provided a computer-readable program, wherein when the program is executed in an apparatus for detecting downlink control information or UE, the program enables a computer to carry out the method for detecting downlink control information as described in the seventh aspect in the apparatus for detecting downlink control information or the UE.

According to a twenty-fourth aspect of the embodiments of the present disclosure, there is provided a storage medium in which a computer-readable program is stored, wherein the computer-readable program enables a computer to carry out the method for detecting downlink control information as described in the seventh aspect in an apparatus for detecting downlink control information or UE.

An advantage of the embodiments of the present disclosure exists in that collision between ePDCCH candidates of different CCs may be avoided as possible or completely avoided, and ePDCCH candidates in the same CC may be avoided from falling into the same eREG group, thereby solving the problems in the prior art.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings:

FIG. 13 is a schematic diagram of Example 1 of Embodiment 7 of the present disclosure;

FIG. 15A is a schematic diagram of a search space obtained by using Formula (11);

DETAILED DESCRIPTION

Figure 1:
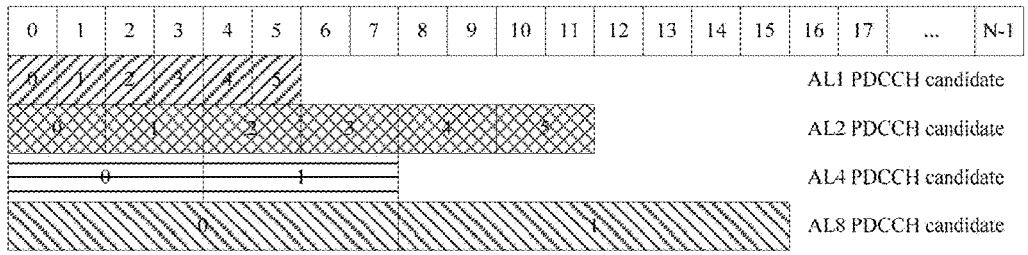
FIG. 1 is a schematic diagram of a search space of a PDCCH.

The foregoing and other features of the present disclosure shall become apparent from the following description with reference to the accompanying drawings. Particular embodiments of the present disclosure are disclosed in the description and drawings, which indicate part of the embodiments that may employ the principle of the present disclosure. It should be understood that the present disclosure is not limited to the described embodiments, on the contrary, the present disclosure includes all the modifications, variations and equivalents falling within the scope of the appended claims.

Embodiment 1

Embodiment 1 of the present disclosure provides a method for determining a search space, including:

determining enhanced control channel elements (eCCEs) occupied by enhanced physical downlink control channel (ePDCCH) candidates in each carrier according to an aggregation level (L) of an ePDCCH and a total number of candidates, the number of eCCEs contained in an ePDCCH set and a parameter related to a C-RNTI of UE and a subframe number; wherein following formula is used in calculation:

$$eCCE(m, i) = L\left\{\left(Y_k + \left\lfloor \frac{m \cdot N_{eCCE}}{L \cdot M} \right\rfloor + n_{CI}\right) \bmod \left\lfloor \frac{N_{eCCE}}{L} \right\rfloor\right\} + i; \quad (4)$$

where, m denotes an ePDCCH candidate index, m=0, ..., M−1, M denotes a total number of candidates needing to be detected by the UE in a blind manner, i=0, 1, ..., L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$=0, 1, ..., $N_{CC}$−1 denotes scheduled carriers, and $N_{CC}$ denotes a total number of the carriers.

Values of above L, M, $N_{eCCE}$ and $N_{CC}$ are positive integers greater than 0.

It may be understood by a person of ordinary skill in the art that all or part of the steps in the method described in the above embodiment may be carried out by related hardware instructed by a program. The program may be stored in a computer-readable storage medium. And when being executed, the program may include all or part of the steps in the method in the above embodiment, and the storage medium may include an ROM, an RAM, a floppy disc, and a compact disc, etc.

An embodiment of the present disclosure further provides an apparatus for determining a search space, as described in the embodiment below. As the principle of the apparatus for solving problems is similar to that of the above method based on the apparatus, the implementation of the method may be referred to for the implementation of the apparatus, and the repeated parts shall not be described any further.

Embodiment 2

Embodiment 2 of the present disclosure provides an apparatus for determining a search space, including:

a first determining unit configured to determine eCCEs occupied by ePDCCH candidates in each carrier according to an aggregation level of an ePDCCH and a total number of candidates, the number of the eCCEs contained in an ePDCCH set and a parameter related to a C-RNTI and a subframe number of UE; wherein following formula is used in calculation:

$$eCCE(m, i) = L\left\{\left(Y_k + \left\lfloor \frac{m \cdot N_{eCCE}}{L \cdot M} \right\rfloor + n_{CI}\right) \bmod \left\lfloor \frac{N_{eCCE}}{L} \right\rfloor\right\} + i; \quad (4)$$

where, m denotes an ePDCCH candidate index, m=0, . . . , M−1, M denotes a total number of candidates needing to be detected by the UE in a blind manner, i=0, 1, . . . , L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$=0, 1, . . . , $N_{CC}$−1 denotes scheduled carriers, and $N_{CC}$ denotes a total number of the carriers.

It can be seen from the above embodiment that in a case where cross-carrier scheduling is taken into account, the search space of the ePDCCHs of each CC is determined by using Formula (4), CC candidates may be consecutively arranged among different CCs, and the ePDCCH candidates in the same CC are kept being distributed into whole available frequency domain resources. In comparison with Formula (2), this calculation method is simple and resources are efficiently utilized.

Figure 6A:
FIG. 6A is a schematic diagram of a search space obtained by using the method shown in Formula (2)
Figure 6B:
FIG. 6B is a schematic diagram of a search space obtained by using the method shown in Formula (4) of an embodiment of the present disclosure.

FIG. 6A is a schematic diagram of a search space obtained by using Formula (2), and FIG. 6B is a schematic diagram of a search space obtained by using Formula (4) of the embodiment of the present disclosure. In FIGS. 6A and 6B, the number of physical resource block pairs (PRB pairs)

N=8,$N_{eCCE}$=32,L=1,M=4,$Y_k$=0,$N_{CC}$=2, and the component carriers are CC0 and CC1.

The method shown in Formula (2) is intended to dig a frequency selectivity scheduling gain to a maximum extent, and the method shown in Formula (4) can utilize resources more efficiently. As shown in FIGS. 6A and 6B, the method shown in Formula (2) needs to use 8 PRB pairs, while the method shown in Formula (4) needs to use 4 PRB pairs.

Embodiment 3

Figure 2:
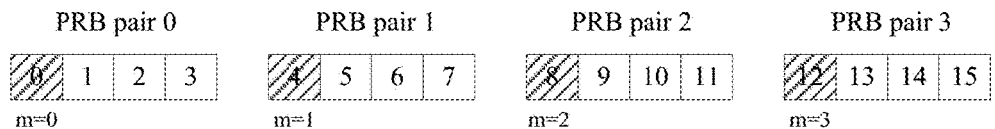
FIG. 2 is an example of a search space of centralized ePDCCHs when an aggregation level L=1.
Figure 3:
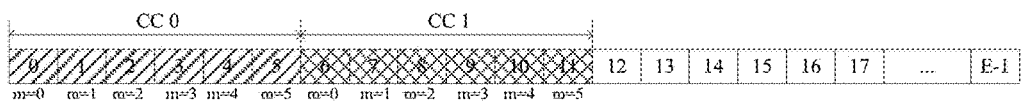
FIG. 3 is a schematic diagram of cross-carrier scheduling of a PDCCH when the number of CCs is 2 and L=1.
Figure 4:
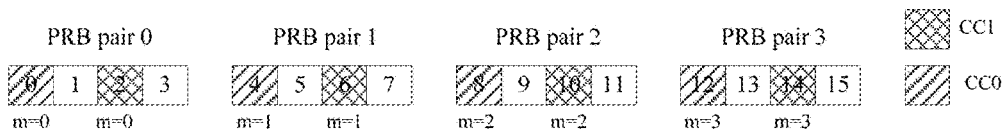
FIG. 4 is a schematic diagram of cross-carrier scheduling of an ePDCCH when the number of CCs is 2 and L=1.

Currently, it is found by the inventors in study that in the single CC scenario shown in FIG. 2 and the multi-CC scenario shown in FIG. 4, for ePDCCH candidates belonging to the same CC, they occupy eCCEs of identical positions in different PRB pairs. The eCCEs of identical positions belong to the same enhanced resource element group (eREG), for use by a distributed eCCE. Hence, in such a case, a distributed ePDCCH that is scheduled will block all centralized ePDCCH candidates.

In light of concerns of multiplexing of distributed ePDCCHs and centralized ePDCCHs, a position of each ePDCCH candidate may be further adjusted, adjusting it into belonging to different eREGs.

For example, in case of a single CC, the position of the ePDCCH candidate may be determined by using Formula (3).

$$A = L\left\{\left(Y_k + \left\lfloor \frac{m \cdot N_{eCCE}}{L \cdot M} \right\rfloor\right) \bmod \left\lfloor \frac{N_{eCCE}}{L} \right\rfloor\right\} \quad (3)$$

$$eCCE(m, i) = N_{eCCERB}\left\lfloor \frac{A}{N_{eCCERB}} \right\rfloor + L \cdot (m + Y_k) \bmod \left(\frac{N_{eCCERB}}{L}\right) + i;$$

where, Formula A denotes that ePDCCH candidates obtained by Formula (2) in a single CC scenario ($n_{CI}$=0) tend to divide equally frequency domain resources. Based upon this, shift adjustment is performed according to the candidate index m in PRB pairs where the ePDCCH candidates are present by using Formula (3), thereby adjusting the ePDCCH candidates into different eREGs.

Figure 5:
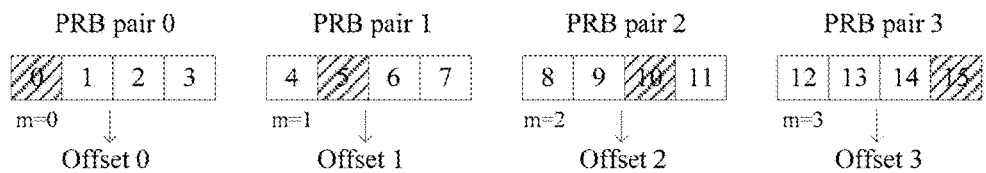
FIG. 5 is an example of a search space of centralized ePDCCHs when an aggregation level L=1.

FIG. 5 is a schematic diagram of an example of a search space of an ePDCCH obtained by using Formula (3), in which settings of ePDCCH parameters are identical to those in FIG. 2. As shown in FIG. 5, the ePDCCH candidates obtained by using Formula (3) are present in the same eREG no longer.

Furthermore, as shown in FIGS. 6A and 6B, such a phenomenon that ePDCCH candidates in the same CC fall into identical eREGs occurs in both the search spaces determined by using formulae (2) and (4). For a case of cross-carrier, besides avoiding ePDCCH candidates in the same CC from falling into identical eREGs, if eCCE resources in an ePDCCH set are capable of accommodating all the ePDCCH candidates in all the CCs, ePDCCH candidates between the CCs should be kept not colliding as possible. There exists no method in the prior for efficiently solving the above problem.

In the embodiment of the present disclosure, there is provided a method for determining a search space in case of multiple CCs, and its basic ways of thinking are:

1) acquiring initial positions of all ePDCCH candidates in all component carriers (CCs), that is, eCCEs or PRB pairs where the ePDCCH candidates are present; and 2) further adjusting the positions of the candidates in the PRB pairs where the initial positions of the ePDCCH candidates are present.

The above adjustment is performed on the basis of the following two aspects: 1) keeping ePDCCH candidates between CCs not colliding as possible; and 2) keeping ePDCCH candidates in the same CC not falling into the eREG as possible.

On the basis of the above ways of thinking, when the eCCE resources in an ePDCCH set are capable of accommodating all the ePDCCH candidates in all the CCs, ePDCCH candidates between different CCs are kept not colliding as possible, and ePDCCH candidates in the same CC are avoided from falling into the same eREG.

In this embodiment, in order to simplify standardization and difficulty of achieving, unified mathematical expressions are used as possible. The embodiment of the present disclosure shall be described below with reference to the accompanying drawings.

Figure 7:
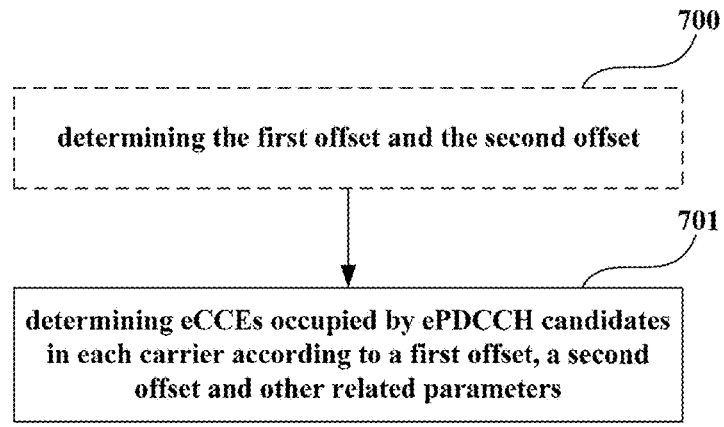
FIG. 7 is a flowchart of a method for determining a search space of Embodiment 3 of the present disclosure.

FIG. 7 is a flowchart of a method for determining a search space of Embodiment 3 of the present disclosure. In case of cross-carrier scheduling, as shown in FIG. 7, the method includes:

step 701: determining eCCEs occupied by ePDCCH candidates in each carrier according to a first offset, a second offset and other related parameters;

wherein the first offset denotes an offset of adjusting the eCCEs occupied by ePDCCH candidates in the same carrier in different eREG groups, and the second offset denotes an offset used for coordinating collision occurs among the eCCEs occupied by ePDCCH candidates in different carriers;

and the related parameters comprise: an aggregation level of the ePDCCH and a total number of candidates, the number of the eCCEs contained in an ePDCCH set, a parameter related to a C-RNTI of UE and a subframe number, and the number ($N_{eCCERB}$) of eCCEs contained in each PRB pair.

In this embodiment, as shown in FIG. 7, the method may further include step 700: determining the first offset and the second offset.

In this embodiment, the second offset may be a parameter selected one CC by one CC. And as the second offset is a CC-specific offset, in order to ensure that the ePDCCH candidates between the CCs not colliding, coordination is often needed between the CCs, so as to jointly select respective second offsets, with their optimal selection needing to be searched exhaustively.

In this embodiment, the first offset may be an ePDCCH candidate index, or may also be an index of a PRB pair; however, this embodiment is not limited thereto.

In order to simplify standardization and difficulty of achieving, the search space of the ePDCCH may be expressed by the following formula:

$$eCCE(m, i) = \qquad (5)$$
$$N_{eCCERB} \left\lfloor \frac{A}{N_{eCCERB}} \right\rfloor + L \cdot (P_1 + P_2 + Y_k) \bmod \left( \frac{N_{eCCERB}}{L} \right) + i.$$

In Formula (5), $P_1$ denotes the first offset, and $P_2$ denotes the second offset;

$$A = L\left\{ \left( Y_k + \left\lfloor \frac{m \cdot N_{eCCE}}{L \cdot M} + \frac{n_{CI} \cdot N_{eCCE}}{L \cdot M \cdot N_{CC}} \right\rfloor \right) \bmod \left\lfloor \frac{N_{eCCE}}{L} \right\rfloor \right\}, \text{ or}$$

$$A = L\left\{ \left( Y_k + \left\lfloor \frac{m \cdot N_{eCCE}}{L \cdot M} \right\rfloor + n_{CI} \right) \bmod \left\lfloor \frac{N_{eCCE}}{L} \right\rfloor \right\};$$

where, m denotes an ePDCCH candidate index, m=0, . . . , M−1, M denotes a total number of candidates needing to be detected by the UE in a blind manner;

i=0, 1, . . . , L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$ denotes scheduled carriers, $n_{CI}$=0, 1, . . . , $N_{CC}$−1, $N_{CC}$ denotes a total number of the carriers, and $N_{eCCERB}$ denotes the number of the eCCEs contained in each physical resource block pair.

Likewise, values of above L, M, $N_{eCCE}$, $N_{CC}$ and $N_{eCCERB}$ are positive integers greater than 0.

It can be seen from the above embodiment that in the case of cross-carrier scheduling, the first offset and the second offset are introduced to avoid the ePDCCH candidates between the CCs from colliding, and avoid the ePDCCH candidates in each CC from falling into the same eREG, thereby solving the problem existed in the prior art.

Embodiment 3 of the present disclosure shall be described below in detail with reference to particular examples.

Embodiment 4

Embodiment 4 of the present disclosure further provides a method for determining a search space. Based on Embodiment 3, when a value of the first offset $P_1$ is the ePDCCH candidate index m, above Formula (5) may be expressed as:

$$eCCE(m, i) = \qquad (6)$$
$$N_{eCCERB} \left\lfloor \frac{A}{N_{eCCERB}} \right\rfloor + L \cdot (m + P_2 + Y_k) \bmod \left( \frac{N_{eCCERB}}{L} \right) + i.$$

In Formula (6), A is as described in Embodiment 3, and definitions of other parameters are the same as those in Embodiment 3, which shall not be described herein any further. The second offset $P_2$ may be a parameter selected one CC by one CC, and an optimal solution may be obtained by global search. The introduction of the second offset $P_2$ may avoid collision of the ePDCCH candidates between the CCs.

Figure 8A:
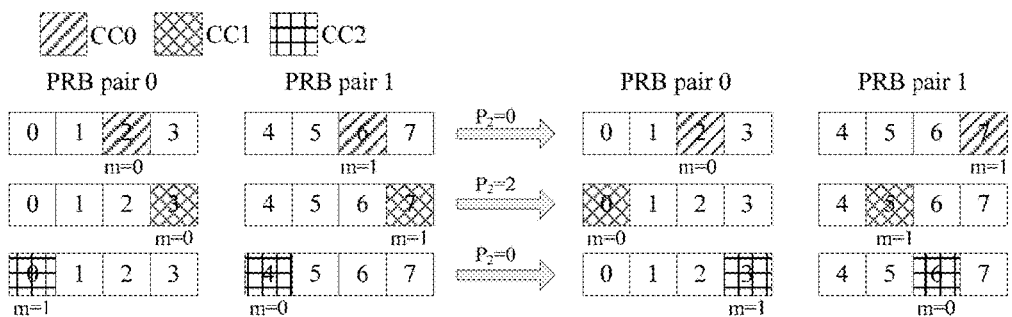
FIG. 8A is a schematic diagram of a particular example of Embodiment 4 of the present disclosure.

FIG. 8A is a schematic diagram of a particular example of Embodiment 4 of the present disclosure, in which the number of PRB pairs contained in the ePDCCH set is N=2, $N_{eCCE}$=8, $N_{eCCERB}$=4, L=1, M=2, $Y_k$=2, and $N_{CC}$=3 (including CC0, CC1 and CC2).

As shown in FIG. 8A, the search space obtained through calculation by using Formula (2) (which may also be obtained through calculation by using Formula (4), not shown) is at the left of the arrow, and the positions of the ePDCCH candidates obtained through calculation by using Formula (6) are at the right of the arrow. In FIG. 8A, the offset of CC0 $P_2$=0, the offset of CC1 $P_2$=2, and the offset of CC2 $P_2$=0, which may ensure that collision of the ePDCCHs between the CCs does not occur, and the ePDCCHs in the same CC do not fall within the same eREG.

It can be seen from the above embodiment that in the case of cross-carrier, the first offset and the second offset are introduced to avoid the ePDCCH candidates between the CCs from colliding, and avoid the ePDCCH candidates in each CC from falling into the same eREG, thereby solving the problem existed in the prior art.

Embodiment 5

Embodiment 5 of the present disclosure further provides a method for determining a search space, in which the value of the first offset $P_1$ is an index of a PRB pair, that is, in Formula (5), $$P_1 = \frac{A - A_{min}}{L} + \left\lfloor \frac{A}{N_{eCCERB}} \right\rfloor; \qquad (7\text{-}1)$$

in such a case, the determination of the eCCEs occupied the ePDCCHs in each carrier is expressed as:

$$eCCE(m, i) = N_{eCCERB} \left\lfloor \frac{A}{N_{eCCERB}} \right\rfloor + \qquad (9\text{-}1)$$
$$L \cdot \left( \frac{A - A_{min}}{L} + \left\lfloor \frac{A}{N_{eCCERB}} \right\rfloor + P_2 + Y_k \right) \bmod \left( \frac{N_{eCCERB}}{L} \right) + i.$$

Furthermore, as improvement, wherein, the value of the first offset $P_1$ is an index of a rearranged PRB pair, that is, in Formula (5), the first offset $P_1$ is expressed as:

$$P_1 = \frac{A - A_{min}}{L} + \left\lfloor \frac{A}{N_{eCCERB} \cdot \lceil N \cdot L/N_{eCCERB} \rceil} \right\rfloor; \quad (7\text{-}2)$$

in such a case, the determination of the eCCEs occupied the ePDCCHs in each carrier is expressed as:

$$eCCE(m, i) = N_{eCCERB} \left\lfloor \frac{A}{N_{eCCERB}} \right\rfloor + \quad (9\text{-}2)$$
$$L \cdot \left( \frac{A - A_{min}}{L} + \left\lfloor \frac{A}{N_{eCCERB} \cdot \lceil N \cdot L/N_{eCCERB} \rceil} \right\rfloor + P_2 + Y_k \right)$$
$$\mod \left( \frac{N_{eCCERB}}{L} \right) + i.$$

In formulae (7-1) and (7-2), $A_{min}$ denotes a minimum value of all the A within a range of a physical resource block pair, which is denoted as follows:

$$A_{min} = \min\{A_{n_1}, A_{n_2}, \ldots, A_{n_N}\}, \quad (8)$$
$$\text{s.t.} \left\lfloor \frac{A_{n_1}}{N_{eCCERB}} \right\rfloor = \left\lfloor \frac{A_{n_2}}{N_{eCCERB}} \right\rfloor = \ldots = \left\lfloor \frac{A_{n_3}}{N_{eCCERB}} \right\rfloor.$$

In Formula (8), s.t. denotes being subjected to constraint conditions listed subsequently, which is a commonly used expression in optimization theories, and shall not be described herein any further; and $A_{n_1}$ to $A_{n_N}$ denote all A that falls within identical PRB pairs, indexed from $n_1$ to $n_N$, and values of which being positive integers greater than or equal to 0.

In this embodiment, the second offset $P_2$ is used to coordinate collision between the CCs, and may be selected one CC by one CC. For example, the optimum may be obtained by global search, so as to achieve a lowest probability of collision, even full avoidance of collision.

Figure 8B:
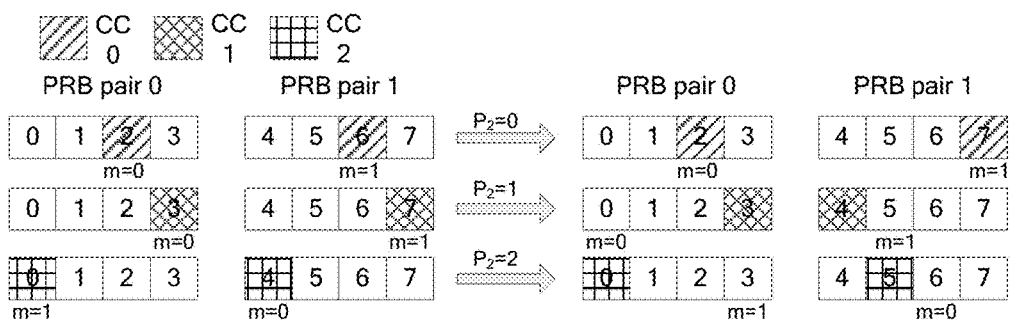
FIG. 8B is a schematic diagram of a particular example of Embodiment 5 of the present disclosure.

Parameter configuration identical to that in FIG. 8A of Embodiment 4 is employed, that is, N=2, $N_{eCCE}$=8, $N_{eCCERB}$=4, L=1, M=2, $Y_k$=2, and $N_{CC}$=3 (including CC0, CC1 and CC2), and FIG. 8B gives a schematic diagram of a search space of Embodiment 5. The search space obtained through calculation by using Formula (2) is at the left of the arrow, and the positions of the ePDCCH candidates obtained through calculation by using Formula (9-2) are at the right of the arrow. The offset of CC0 $P_2$=0, the offset of CC1 $P_2$=1, and the offset of CC2 $P_2$=2, which may ensure that collision of the ePDCCHs between the CCs does not occur, and the ePDCCHs in the same CC do not fall within the same eREG.

$$\left\lfloor \frac{A}{N_{eCCERB} \cdot \lceil N \cdot L/N_{eCCERB} \rceil} \right\rfloor$$

in Formula (7-1) is used to obtain indices of rearranged PRB pairs, and the rearrangement here is for better avoiding the ePDCCH candidates in the same CC from falling within the same eREG.

Figures 9A, 9B:
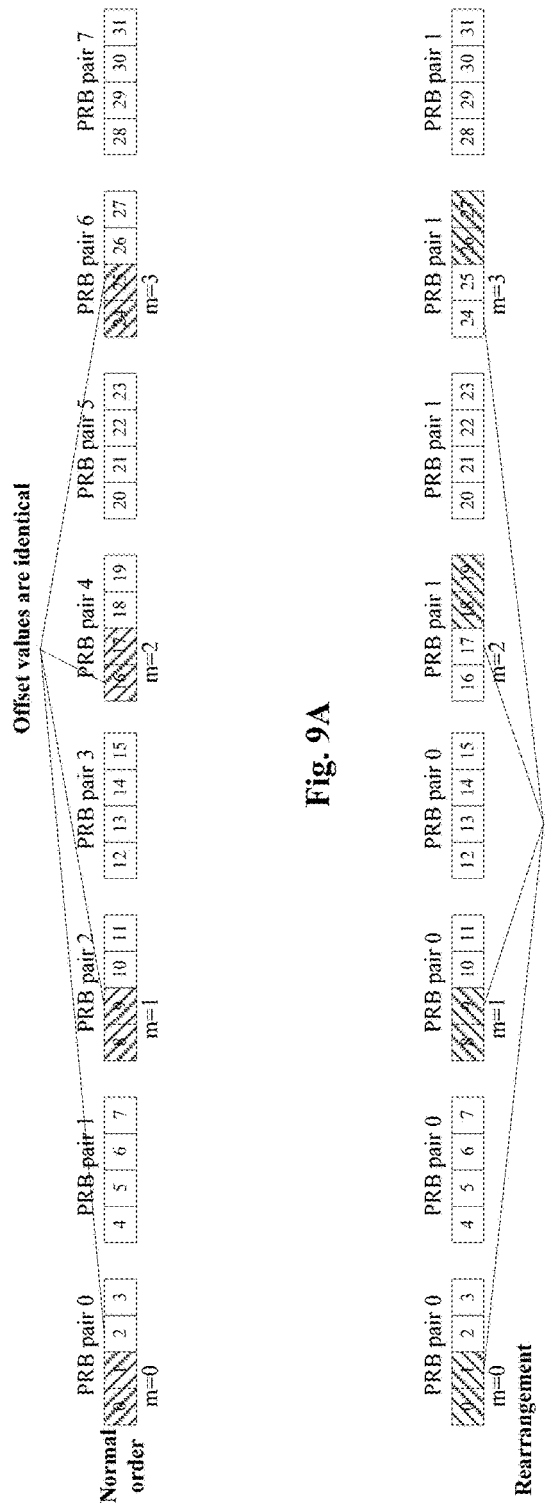
FIG. 9A is a schematic diagram of a case of no rearrangement of PRB pairs.
FIG. 9B is a schematic diagram of rearrangement of PRB pairs of Embodiment 6 of the present disclosure.

FIG. 9A is a schematic diagram of a case of no rearrangement of PRB pairs. In the case of no rearrangement of PRB pairs, the positions of the eCCEs are determined by using Formula (9-1). In FIG. 9A, the parameters are N=8, $N_{eCCERB}$=4, L=2, M=4, and $Y_k$=0.

FIG. 9B is a schematic diagram of rearrangement of PRB pairs, in which the positions of the ePDCCH candidates are determined by using Formula (9-2), and the parameter configuration is identical to that of FIG. 9A.

FIG. 9A shows positions of four ePDCCH candidates when the PRB pairs are indexed sequentially and the aggregation level L=2. As shown in the figure, the four ePDCCH candidates will experience identical offset in each PRB pair. Hence, the candidates still fall within the same eREG. Equivalent offsets here are all 0.

As shown in FIG. 9B, after indices of the PRB pairs are rearranged, only two indices, 0 and 1, occur in all the PRB pairs, and are alternately arranged. At this moment, for the four ePDCCH candidates, the former two experience an offset 0, and the latter two experience an offset 1, thereby avoiding occurrence of all the candidates falling within the same eREG.

Figure 10:
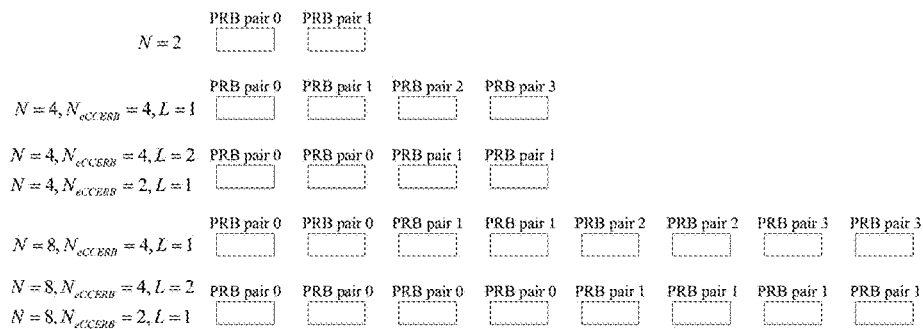
FIG. 10 is a schematic diagram of all combinations of rearrangement of PRB pairs having effect on the number of occupied eREGs.

FIG. 10 shows all combinations of indices of the PRB pairs after rearrangement of PRB pairs performed by using $$\left\lfloor \frac{A}{N_{eCCERB} \cdot \lceil N \cdot L/N_{eCCERB} \rceil} \right\rfloor.$$

It can be seen from formulae (9-1) and (9-2) that by introducing the PRB pair specific offsets, adjustability of the ePDCCH candidates between the CCs is increased, and collision between different CCs may be avoided.

Figure 11:
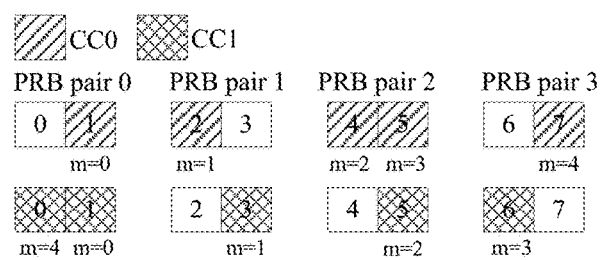
FIG. 11 is a schematic diagram of a search space of an ePDCCH determined by using Formula (6) of Embodiment 4.

In comparison with the search space determined by Formula (6) of Embodiment 4, an index of PRB pairs is used as the first offset in this embodiment, which may avoid collision more efficiently. As shown in FIG. 11, N=4, $N_{eCCERB}$=2, L=1, M=5, $Y_k$=1, $N_{CC}$=2, and if Formula (6) of Embodiment 4 is used, whatever a value of the second offset is, collision occurs in two ePDCCH candidates m=0 and m=4 of CC1 in PRB pair 0. However, if formulae (9-1) and (9-2) of this embodiment are used, collision of ePDCCH candidates in the same CC will not occur.

Embodiment 6

In Embodiment 5, the optimum of the second offset $P_2$ may be obtained by global search, which may achieve a lowest probability of collision; however, complexity of calculation of the global search is relatively high.

In order to avoid increase of the complexity of calculation brought about by the global search, in this embodiment, the second offset $P_2$ is set to be $P_2 = n_{CI}$, so that the calculation is simplified.

Hence, Formula (9) may be expressed as Formula (10):

$$eCCE(m, i) = N_{eCCERB} \left\lfloor \frac{A}{N_{eCCERB}} \right\rfloor + \quad (10)$$
$$L \cdot \left( \frac{A - A_{min}}{L} + \left\lfloor \frac{A}{N_{eCCERB} \cdot \lceil N \cdot L/N_{eCCERB} \rceil} \right\rfloor + n_{CI} + Y_k \right)$$
$$\mod \left( \frac{N_{eCCERB}}{L} \right) + i.$$

Figure 12:
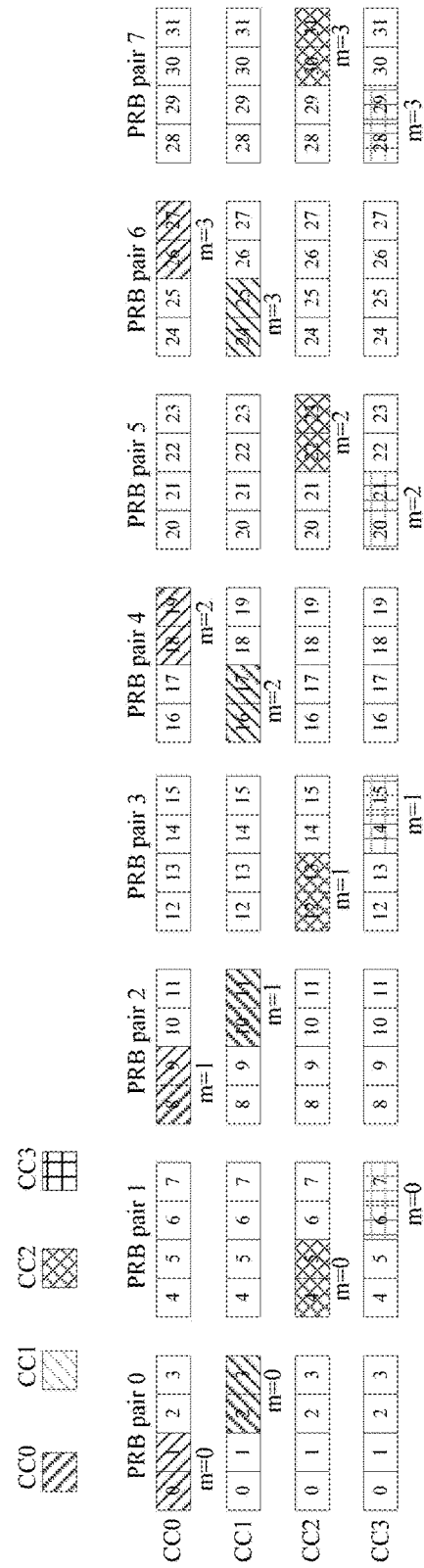
FIG. 12 is a schematic diagram of a particular example of Embodiment 6 of the present disclosure.

FIG. 12 is a schematic diagram of a particular example of Embodiment 6 of the present disclosure, in which N=8, $N_{eCCERB}$=4, L=2, M=4, $Y_k$=0, $N_{CC}$=4. For the case shown in FIG. 11, no collision occurs in the ePDCCH candidates between the CCs, and the ePDCCH candidates in the same CC do not fall within the same eREG.

Embodiment 7

In Formula (6) of Embodiment 4, the second offset $P_2$ is a CC-specific offset, and in order to ensure that collision of the ePDCCHs between the CCs does not occur, coordination is needed between the CCs, so as to jointly select respective second offsets, which results in relatively high complexity.

It is found in studies that in order to simplify calculation, the method of the embodiment of the present disclosure may be employ, in which certain existence of collision is permitted, but occurrence of collision in most configuration can be avoided.

Embodiment 7 of the present disclosure provides a method for determining a search space of ePDCCHs, which differs from embodiments 3 and 4 that manners of calculation of A are different, and the first offset $P_1$=m, and the second offset $P_2=n_{CI}$, as shown in Formula (11):

$$eCCE(m, i) = N_{eCCERB} \left\lfloor \frac{A}{N_{eCCERB}} \right\rfloor + L \cdot (P_1 + P_2 + Y_k) \bmod \left( \frac{N_{eCCERB}}{L} \right) + i; \quad (11)$$

where, a value of A is calculated by using Formula (12):

$$A = L \left\{ \left( Y_k + \left\lfloor \frac{m \cdot N_{eCCE}}{L \cdot M} \right\rfloor \right) \bmod \left\lfloor \frac{N_{eCCE}}{L} \right\rfloor \right\}; \quad (12)$$

In the above formula, m denotes an ePDCCH candidate index, m=0, . . . , M−1, M denotes a total number of candidates needing to be detected by the UE in a blind manner;

i=0, 1, . . . , L−1 denotes an eCCE in a candidate m, $Y_k$ denotes a parameter related to a C-RNTI of the UE and a subframe number, $N_{eCCE}$ denotes the total number of the eCCEs contained in the ePDCCH set, $n_{CI}$ denotes scheduled carriers, $n_{CI}$=0, 1, . . . , $N_{CC}$−1, $N_{CC}$ denotes a total number of the carriers, and $N_{eCCERB}$ denotes the number of the eCCEs contained in each PRB pair.

In this embodiment, determination of the search space by using Formula (11) may ensure that the ePDCCHs in the same CC do not fall within the same eREG. Furthermore, taking the CC identifier $n_{CI}$ as the second offset $P_2$ of ePDCCH candidates between different CCs is intended to place an ePDCCH candidate of a next CC immediately after an ePDCCH candidate of a preceding CC. As a maximum number of CCs supported in the existing standards is 5, that is, $n_{CI}$=0, 1, 2, 3, 4, while the ePDCCH candidates are arranged in turn in a range of a PRB pair in Formula (11), collision of ePDCCH candidates between the CCs cannot be completely avoided.

Figure 13:
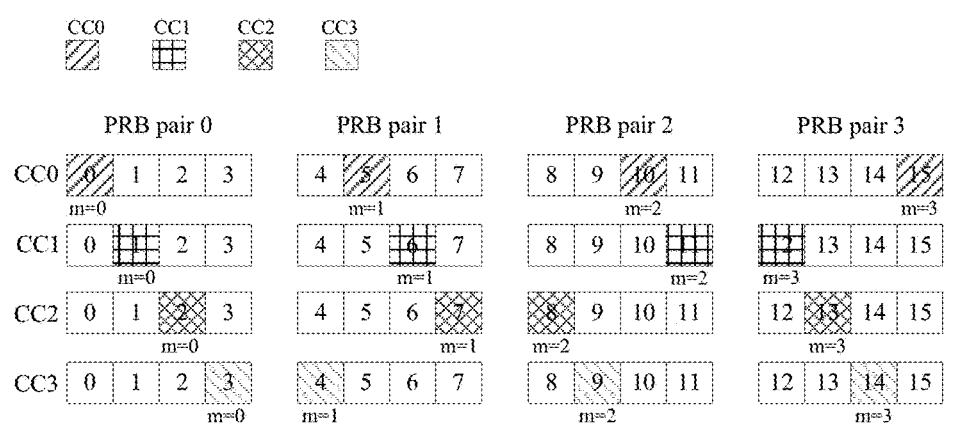

FIG. 13 is a schematic diagram of Example 1 of Embodiment 7 of the present disclosure, giving a case where collision can be completely avoided. In the example shown in FIG. 13, N=4, $N_{eCCERB}$=4, L=1, M=4, $Y_k$=0, $N_{CC}$=4.

Figure 14:
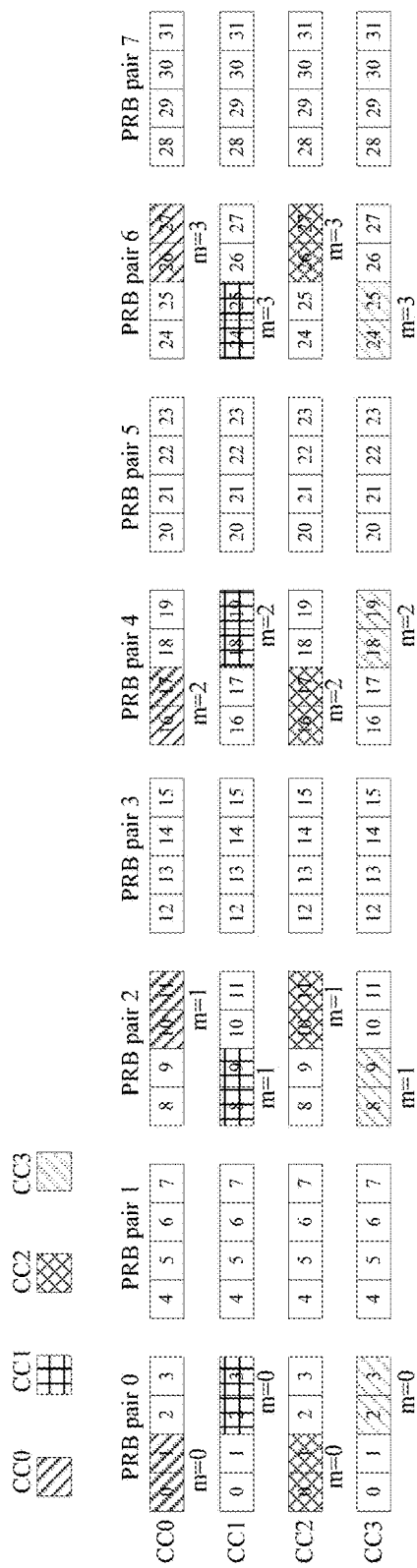
FIG. 14 is a schematic diagram of Example 2 of Embodiment 7 of the present disclosure.

FIG. 14 is a schematic diagram of Example 2 of Embodiment 7 of the present disclosure, giving a case where collision exists between CCs. A reason that collision occurs between the CCs in FIG. 14 is that the ePDCCH candidates are only adjusted in a range of a PRB pair. In the example shown in FIG. 14, N=8, $N_{eCCERB}$=4, L=2, M=4, $Y_k$=0, $N_{CC}$=4.

The search spaces obtained by using the methods of Embodiment 6 (corresponding to Formula (10)) and Embodiment 7 (corresponding to Formula (11)) are compared below with respect to performance.

Table 2 shows all feasible configuration when $N_{eCCERB}$=4 and conditions of no collision of candidates between CCs nor collision of candidates in a CC are met, and an optimal search space design will not bring collision to all the configuration in Table 2. Table 3 shows configuration where collision can be produced when Formula (11) is used, and Table 4 shows configuration where collision can be produced when Formula (10) is used. It can be seen from tables 2, 3 and 4 that the collision in Formula (10) is reduced relative to that of Formula (11).

TABLE 2

All feasible configuration when $N_{eCCERB}$ = 4 (N_CC denotes a number of scheduled carriers)

| | | | |
|---|---|---|---|
| N = 2 | L = 1 | N_CC = 2 | M = 2 |
| | | | M = 3 |
| | | | M = 4 |
| | | N_CC = 3 | M = 2 |
| | | N_CC = 4 | M = 2 |
| | L = 2 | N_CC = 2 | M = 2 |
| | L = 4 | N_CC = 2 | M = 1 |
| N = 4 | L = 1 | N_CC = 2 | M = 3 |
| | | | M = 4 |
| | | | M = 6 |
| | | N_CC = 3 | M = 3 |
| | | | M = 4 |
| | | N_CC = 4 | M = 3 |
| | | | M = 4 |
| | | N_CC = 5 | M = 3 |
| | L = 2 | N_CC = 2 | M = 3 |
| | | | M = 4 |
| | L = 4 | N_CC = 2 | M = 1 |
| | | | M = 2 |
| | | N_CC = 3 | M = 1 |
| | | N_CC = 4 | M = 1 |
| | L = 8 | N_CC = 2 | M = 1 |
| N = 8 | L = 1 | N_CC = 2 | M = 3 |
| | | | M = 4 |
| | | | M = 6 |
| | | N_CC = 3 | M = 3 |
| | | | M = 4 |
| | | | M = 6 |
| | | N_CC = 4 | M = 3 |
| | | | M = 4 |
| | | | M = 6 |
| | | N_CC = 5 | M = 3 |
| | | | M = 4 |
| | | | M = 6 |
| | L= 2 | N_CC = 2 | M = 3 |
| | | | M = 4 |
| | | | M = 6 |
| | | N_CC = 3 | M = 4 |
| | | | M = 3 |
| | | N_CC = 4 | M = 4 |
| | | | M = 3 |
| | | N_CC = 5 | M = 3 |
| | L = 4 | N_CC = 2 | M = 1 |
| | | | M = 2 |
| | | N_CC = 3 | M = 1 |
| | | | M = 2 |
| | | N_CC = 4 | M = 1 |
| | | | M = 2 |
| | | N_CC = 5 | M = 1 |

TABLE 2-continued

All feasible configuration when $N_{eCCERB}$ = 4 (N_CC denotes a number of scheduled carriers)

| | | |
|---|---|---|
| L = 8 | N_CC = 2 | M = 1 |
| | | M = 2 |
| | N_CC = 3 | M = 1 |
| | N_CC = 4 | M = 1 |

TABLE 3

Configuration where collision occurs when Formula (11) is used when $N_{eCCERB}$ = 4

| N = 2 | L = 1 | N_CC = 2 | M = 3 |
|---|---|---|---|
| | | | M = 4 |
| N = 4 | L = 1 | N_CC = 2 | M = 6 |
| | | N_CC = 5 | M = 3 |
| N = 8 | L = 1 | N_CC = 5 | M = 6 |
| | | | M = 4 |
| | | | M = 3 |
| | L = 2 | N_CC = 3 | M = 4 |
| | | | M = 3 |
| | | N_CC = 4 | M = 4 |
| | | | M = 3 |
| | | N_CC = 5 | M = 3 |

TABLE 4

Configuration where collision occurs when Formula (10) is used when $N_{eCCERB}$ = 4

| N = 2 | L = 1 | N_CC = 2 | M = 3 |
|---|---|---|---|
| N = 4 | L = 1 | N_CC = 2 | M = 6 |
| | | N_CC = 5 | M = 3 |
| N = 8 | L = 1 | N_CC = 5 | M = 6 |
| | | | M = 4 |
| | | | M = 3 |
| | L = 2 | N_CC = 5 | M = 3 |

Furthermore, for some configuration generating collision to both formulae (11) and (10), Formula (10) is also able to relatively reduce collision. Following are examples.

Figure 15A:
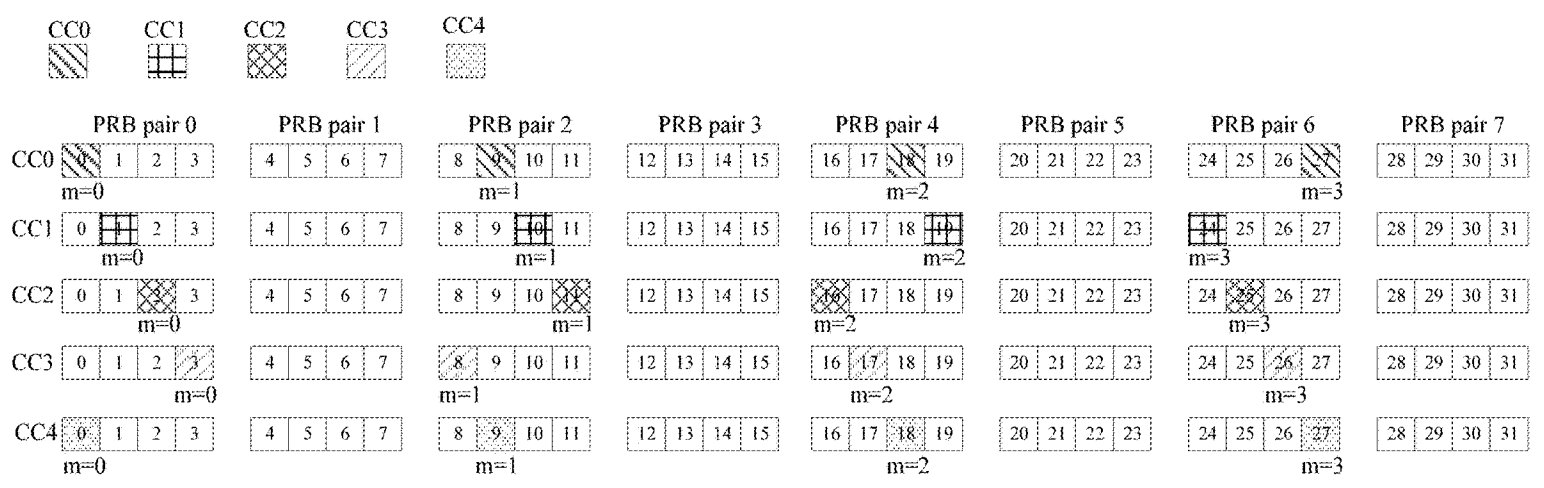
Figure 15B:
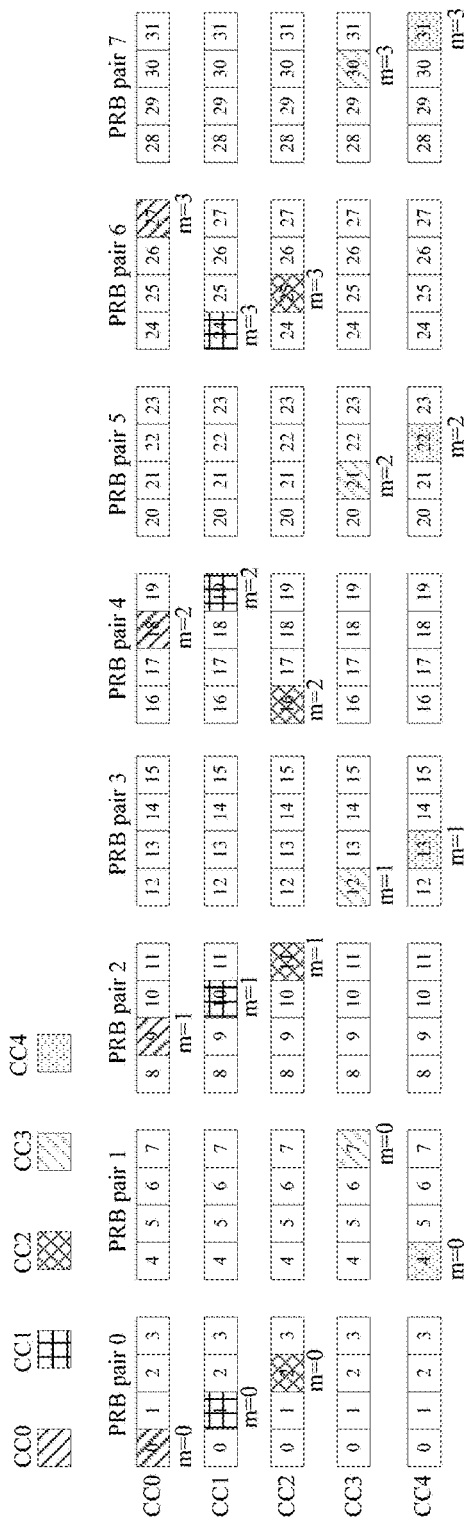
FIG. 15B is a schematic diagram of a search space obtained by using Formula (10)

FIG. 15A is a schematic diagram of a search space obtained by using Formula (11), and FIG. 15B is a schematic diagram of a search space obtained by using Formula (10). In FIGS. 15A and 15B, N=8, $N_{eCCERB}$=4, L=1, M=4, $Y_k$=0, $N_{CC}$=5.

In the configuration shown in FIG. 15A, for Formula (11), whatever a value of $Y_k$ is, collision between CC0 and CC4 will occur, because the ePDCCH candidates are arranged in turn in a PRB pair. By contrast, use of Formula (10) will not bring collision to all the $Y_k$, and in some values of $Y_k$, collision can be completely avoided. FIGS. 15A and 15B give comparison of results of formulae (10) and (11) when $Y_k$=0; wherein there exists collision in the ePDCCH candidates determined by Formula (11), and there exists no collision in the ePDCCH candidates determined by Formula (10).

Embodiment 8

Embodiment 8 of the present disclosure further provides a method for determining a search space, including: determining eCCEs occupied by ePDCCH candidates in each carrier in a manner as below:

$$eCCE(m, i) = N_{eCCERB} \left\lfloor \frac{A}{N_{eCCERB}} \right\rfloor + \qquad (13);$$
$$L \cdot \left( \left\lfloor \frac{A}{L} \right\rfloor + \left\lfloor \frac{A}{N_{eCCERB} \cdot \lceil N \cdot L/N_{eCCERB} \rceil} \right\rfloor \right) \mod\left(\frac{N_{eCCERB}}{L}\right) + i$$

where, $$A = L\left\{ \left(Y_k + \left\lfloor \frac{m \cdot N_{eCCE}}{L \cdot M} + \frac{n_{CI} \cdot N_{eCCE}}{L \cdot M \cdot N_{CC}} \right\rfloor \right) \mod\left\lfloor \frac{N_{eCCE}}{L} \right\rfloor \right\},$$

or $$A = L\left\{ \left(Y_k + \left\lfloor \frac{m \cdot N_{eCCE}}{L \cdot M} \right\rfloor + n_{CI} \right) \mod\left\lfloor \frac{N_{eCCE}}{L} \right\rfloor \right\};$$

and where, m denotes an ePDCCH candidate index, m=0, . . . , M−1, M denotes a total number of candidates needing to be detected by UE in a blind manner, i=0, 1, . . . , L−1 denotes an eCCE index in a candidate m, $Y_k$ denotes a parameter related to a C-RNTI of the UE and a subframe number, $N_{eCCE}$ denotes a total number of eCCEs contained in an ePDCCH set, $n_{CI}$ denotes scheduled carriers, $n_{CI}$=0, 1, . . . , $N_{CC}$−1, $N_{CC}$ denotes a total number of carriers, and $N_{eCCERB}$ denotes the number of eCCEs contained in each PRB pair.

Likewise, values of above L, M, $N_{eCCE}$, $N_{CC}$ and $N_{eCCERB}$ are positive integers greater than 0.

In embodiments 4-7, emphasis is laid on optimization of the ePDCCH candidates in the same CC not falling within the same eREG, while in Formula (13) of Embodiment 8, emphasis is laid on avoidance of collision of the ePDCCH candidates between the CCs.

Under a condition of sufficient resources, for any configuration, Formula (13) is able to completely avoid collision of the ePDCCH candidates between the CCs, but is unable to completely avoid ePDCCH candidates in the same CC from falling within the same eREG.

Figure 16A:
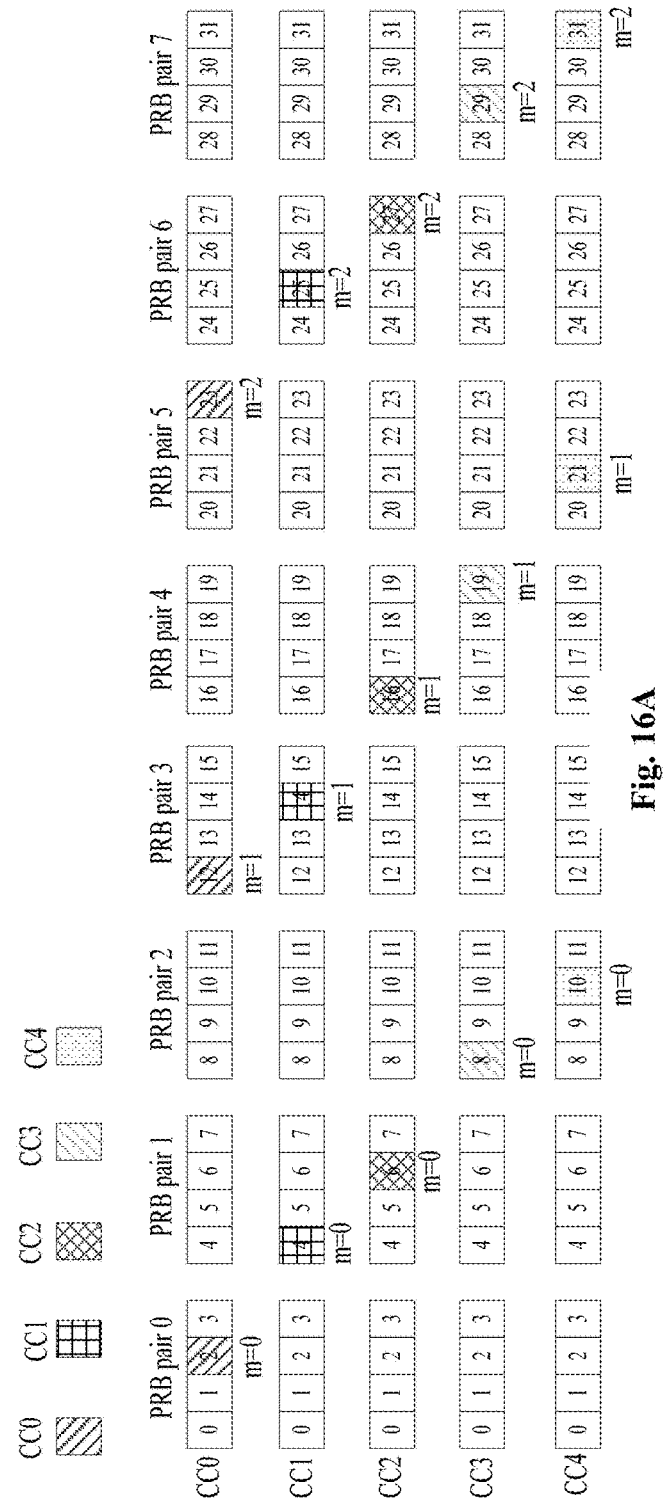
FIG. 16A shows a schematic diagram of a search space determined by using Formula (2)
Figure 16B:
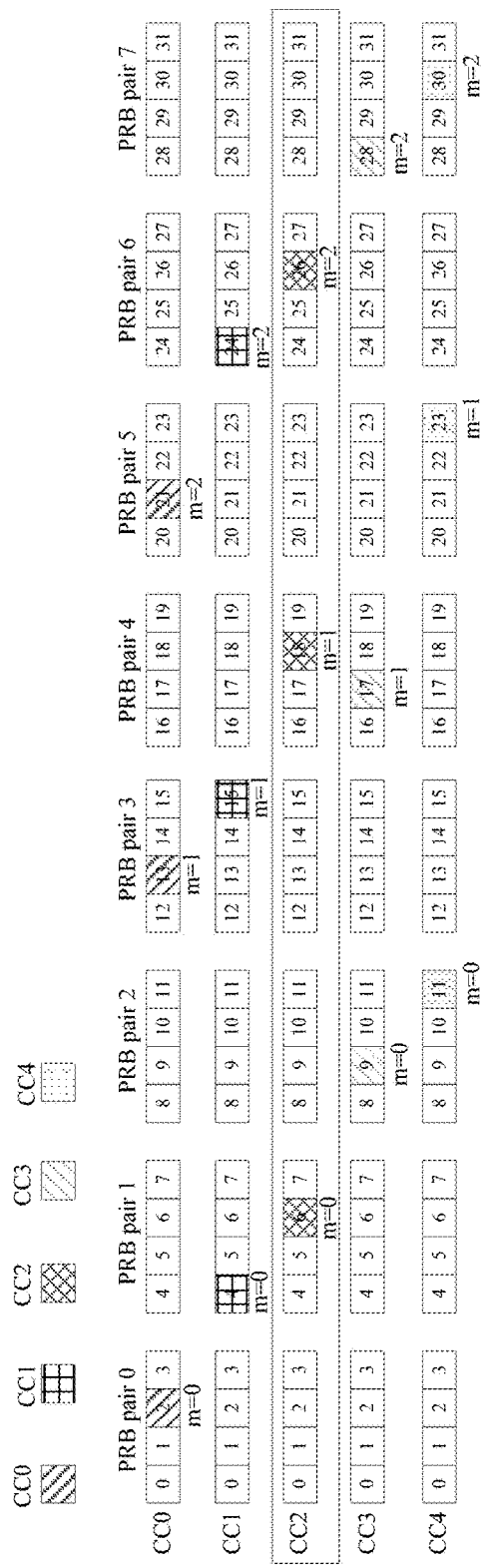
FIG. 16B shows a schematic diagram of a search space determined by using Formula (13)

FIG. 16A shows a schematic diagram of a search space determined by using Formula (2) (i.e. A in Formula (13)), and FIG. 16B shows a schematic diagram of a search space determined by using Formula (13). As shown in FIG. 16B, the ePDCCH candidates in CC2 fall within the same eREG. Therefore, this embodiment of the present disclosure is actually a method compromising to another direction.

Configuration of FIGS. 16A and 16 B is as follows: N=8, $N_{eCCERB}$=4, L=1, M=3, $Y_k$=2, $N_{CC}$=5.

The above embodiments 3-8 are all based on the ways of thinking described in Embodiment 3:

1) acquiring initial positions of all ePDCCH candidates in all component carriers (CCs), that is, eCCEs or PRB pairs where the ePDCCH candidates are present; and 2) further adjusting the positions of the candidates in the PRB pairs where the initial positions of the ePDCCH candidates are present. Furthermore, in order to simplify standardization and difficulty of achieving, unified mathematical expressions, i.e. formulae (5), (6) (9-1) and (9-2), (10), (11) and (12), are used as possible. Furthermore, the initial positions of the ePDCCH candidates are obtained based on formulae (2) or (4).

In the embodiment below, if formula "A" in the above formula is improved, collision of the candidates between the CCs may further be reduced. Following are examples.

Embodiment 9

In this embodiment, improvement is made based on above Formula (2).

The search space is determined in a manner as below:

$$eCCE(m, i) = \qquad (14)$$
$$N_{eCCERB} \cdot B + L \cdot \left(m - m_{min} + \left\lfloor \frac{B}{\lceil N \cdot L/N_{eCCERB} \rceil} \right\rfloor + n_{CI} \left\lceil \frac{M}{N} \right\rceil + Y_k \right) \mod \left\lceil \frac{N_{eCCERB}}{L} \right\rceil + i;$$

In Formula (14), B may be obtained by Formula (15) below:

$$B = L_{RB} \left\{ \left( Y_k + \left\lfloor \frac{m \cdot N}{L_{RB} \cdot M} \right\rfloor + \left\lfloor \frac{n_{CI} \cdot N}{L_{RB} \cdot M \cdot N_{CC}} \right\rfloor \right) \mod \left\lfloor \frac{N}{L_{RB}} \right\rfloor \right\}; \qquad (15)$$

In formulae (14) and (15), $$L_{RB} = \left\lceil \frac{L}{N_{eCCERB}} \right\rceil$$

denotes the number of PRB pairs occupied by candidates with an aggregation level L, B denotes an index of a PRB pair, and $m_{min}$ denotes a minimum value of all the m that falls within a PRB pair with an index of B. B is used in formulae (14) and (15) to improve A in the above embodiments, and an index of a PRB pair where the candidates are present is obtained. Furthermore, $$n_{CI} = \left\lceil \frac{M}{N} \right\rceil$$

is used for an offset between the CCs, so as to avoid collision when exist two candidates in a PRB pair.

Table 5 counts configuration where collision can be produced when formulae (14) and (15) are used, from which it can be seen that collision between the CCs are further reduced. Actually, Formula (14) is expanded based on the principle of Formula (2), that is, candidates of different CCs are dispersed in different PRB pairs as possible.

TABLE 5

Configuration where collision occurs when Formula (14) is used when $N_{eCCERB} = 4$

| N = 4 | L = 1 | N_CC = 5 | M = 3 |
|---|---|---|---|
| N = 8 | L = 1 | N_CC = 5 | M = 3 |
|  |  | N_CC = 5 | M = 6 |
|  | L = 2 | N_CC = 4 | M = 3 |
|  |  | N_CC = 5 | M = 3 |

Embodiment 10

Likewise, corresponding expansion may be made based on the principle of Formula (4), that is, starting from a point of view of saving resources, candidates of different CCs are made to fill allocated PRB pairs as possible. Expression of the search space is as shown in Formula (16):

$$eCCE(m, i) = \qquad (16)$$
$$N_{eCCERB} \cdot B + L \cdot \left(m - m_{min} + \left\lfloor \frac{B}{\lceil N \cdot L/N_{eCCERB} \rceil} \right\rfloor + n_{CI} \left\lceil \frac{M}{N} \right\rceil + Y_k \right) \mod \left\lceil \frac{N_{eCCERB}}{L} \right\rceil + i;$$

In Formula (16), B may be obtained by Formula (17):

$$B = L_{RB} \left\{ \left( Y_k + \left\lfloor \frac{m \cdot N}{L_{RB} \cdot M} \right\rfloor + \left\lfloor \frac{n_{CI} \cdot L}{L_{RB} \cdot N_{eCCERB}} \right\rfloor \right) \mod \left\lfloor \frac{N}{L_{RB}} \right\rfloor \right\}. \qquad (17)$$

In formulae (16) and (17), meanings of the parameters are identical to those in formulae (14) and (15).

Table 6 counts configuration where collision can be produced when formulae (16) and (17) are used.

TABLE 6

Configuration where collision occurs when Formula (16) is used when $N_{eCCERB} = 4$

| N = 4 | L = 1 | N_CC = 5 | M = 3 |
|---|---|---|---|
| N = 8 | L = 1 | N_CC = 5 | M = 6 |
|  | L = 2 | N_CC = 5 | M = 3 |

Embodiment 11

This variation is also correspondingly expanded based on the principle of Formula (4). Expression of the search space is as shown in Formula (18):

$$eCCE(m, i) = N_{eCCERB} \cdot B + L \cdot \left(m + n_{CI} \left\lceil \frac{M}{N} \right\rceil + Y_k \right) \mod \left\lceil \frac{N_{eCCERB}}{L} \right\rceil + i. \qquad (18)$$

In Formula (18), B may be expressed by Formula (19) below:

$$B = L_{RB} \left\{ \left( \left\lceil \frac{Y_k}{N_{eCCERB}} \right\rceil + \left\lfloor \frac{m \cdot N}{L_{RB} \cdot M} \right\rfloor + \left\lfloor \frac{n_{CI} \cdot L}{L_{RB} \cdot N_{eCCERB}} \right\rfloor \right) \mod \left\lfloor \frac{N}{L_{RB}} \right\rfloor \right\}. \qquad (19)$$

A counting result of configuration where collision can be produced when formulae (18) and (19) are used is identical to that shown in Table 6.

It can be seen from the above embodiments that based on the ways of thinking described in Embodiment 3 and taking simplification of standardization and difficulty of achieving into account, unified mathematical expressions, i.e. the formulae in embodiments 3-11, are used to determine the search spaces of the ePDCCHs. When the eCCE resources in an ePDCCH set are capable of accommodating all the ePDCCH candidates in all the CCs, ePDCCH candidates between different CCs are kept not colliding as possible, and ePDCCH candidates in the same CC are avoided from falling into the same eREG, thereby solving the problems in the art in case of cross-carrier.

It may be understood by a person of ordinary skill in the art that all or part of the steps in the method described in the above embodiment may be carried out by related hardware instructed by a program. The program may be stored in a computer-readable storage medium. And when being executed, the program may include all or part of the steps in the method in the above embodiment, and the storage medium may include an ROM, an RAM, a floppy disc, and a compact disc, etc.

An embodiment of the present disclosure further provides an apparatus for determining a search space, as described in the embodiment below. As the principle of the apparatus for solving problems is similar to that of the above method based on the apparatus, the implementation of the method may be referred to for the implementation of the apparatus, and the repeated parts shall not be described any further.

Embodiment 12

Figure 17:
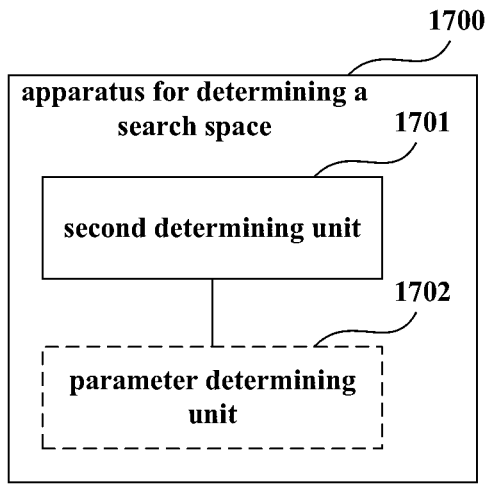
FIG. 17 is an apparatus for determining a search space of Embodiment 12 of the present disclosure.

FIG. 17 is a schematic diagram of a structure of an apparatus for determining a search space of Embodiment 12 of the present disclosure. As shown in FIG. 17, the apparatus 1700 includes: a second determining unit 1701 configured to determine eCCEs occupied by ePDCCH candidates in each carrier according to a first offset, a second offset and other related parameters;

wherein the first offset denotes an offset of adjusting the eCCEs occupied by ePDCCH candidates in the same carrier in different eREG groups, and the second offset denotes an offset used for coordinating collision occurs among the eCCEs occupied by ePDCCH candidates in different carriers;

and the related parameters include: an aggregation level of the ePDCCH and a total number of candidates, the number of eCCEs contained in an ePDCCH set, a parameter related to a C-RNTI of UE and a subframe number, and the number of eCCEs contained in each PRB pair.

It can be seen from the above embodiment that in the case of cross-carrier, the first offset and the second offset are introduced to avoid the ePDCCH candidates between the CCs from colliding as possible, and avoid the ePDCCH candidates in each CC from falling into the same eREG as possible, thereby solving the problem existed in the prior art.

In this embodiment, as shown in FIG. 17, the apparatus 1700 may further include a parameter determining unit 1702 configured to determine the first offset and the second offset.

In this embodiment, the second determining unit 1701 may use a formula identical to Formula (5) of Embodiment 3 to determine the search space of the ePDCCHs, which shall not be described herein any further.

In this embodiment, the parameter determining unit 1702 is optional, and when the parameters needed in Formula (5) are all obtained and stored in the apparatus 1700, the second determining unit 1701 may directly use these related parameters to determine the search space.

Embodiment 13

Embodiment 13 of the present disclosure further provides an apparatus for determining a search space, which is based on Embodiment 12, and differs from Embodiment 12 that in determining the search space by the second determining unit 1701, index m of an eCCE occupied by an ePDCCH is taken as the first offset $P_1$. Its final formula is identical to Formula (6) of Embodiment 4, and shall not be described herein any further.

Embodiment 14

Embodiment 14 of the present disclosure further provides an apparatus for determining a search space, which is based on Embodiment 12, and differs from Embodiment 12 that in determining the search space by the second determining unit 1701, an index of a PRB pair is taken as the first offset $P_1$. The used formulae are identical to formulae (7)-(9-2) of Embodiment 5, and shall not be described herein any further.

Embodiment 15

Embodiment 15 of the present disclosure further provides an apparatus for determining a search space, which is based on Embodiment 14, and differs from Embodiment 14 that in determining the search space by the second determining unit 1701, the second offset $P_2 = n_{CI}$. The used formula is identical to Formula (10) of Embodiment 6, and shall not be described herein any further.

Embodiment 16

Embodiment 16 of the present disclosure further provides an apparatus for determining a search space, which differs from Embodiment 12 that the value of A is different, the first offset $P_1 = m$, and the second offset $P_2 = n_{CI}$. In determining the search space by the second determining unit 1701 the used formula is identical to Formula (11) of Embodiment 7, which shall not be described herein any further.

In the above embodiments 13-16, besides being configured to determine the first offset and the second offset, the parameter determining unit 1702 is further configured to determine the parameters in the above formulae (5)-(11).

Embodiment 17

Embodiment 17 of the present disclosure further provides an apparatus for determining a search space, including a third determining unit configured to use a formula identical Formula (13) of Embodiment 8, which shall not be described herein any further.

In the above Embodiment 17, the parameter determining unit 1702 is configured to determine the parameters in the above Formula (13).

It can be seen from the above embodiment that in the case of cross-carrier, the first offset and the second offset are introduced to avoid the ePDCCH candidates between the CCs from colliding as possible, and avoid the ePDCCH candidates in each CC from falling into the same eREG as possible, thereby solving the problem existed in the prior art.

Embodiment 18

Embodiment 18 of the present disclosure further provides an apparatus for determining a search space, including a fourth determining unit (not shown). In determining a search space, the fourth determining unit may use formulae (14) and (15), (16) and (17), (18) and (19), of Embodiment 9 or Embodiment 10 or Embodiment 11, which shall not be described herein any further.

Embodiment 19

Figure 18:
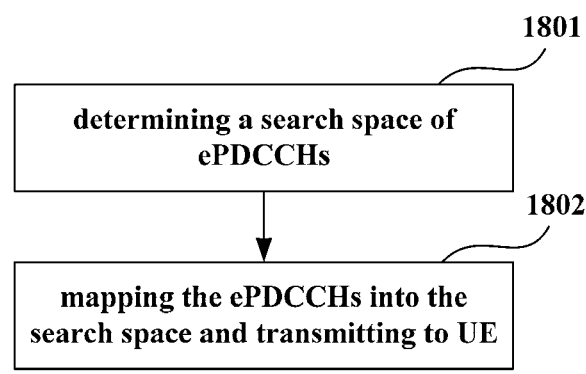
FIG. 18 is a flowchart of a method for transmitting downlink control information of Embodiment 19 of the present disclosure.

FIG. 18 is a flowchart of a method for transmitting downlink control information of Embodiment 19 of the present disclosure. As shown in FIG. 18, the method includes:

step 1801: determining a search space of ePDCCHs;

in this embodiment, the methods described in embodiments 1 and 3-11 are used to determine the search space, which shall not be described herein any further;

step 1802: mapping the ePDCCHs into the search space and transmitting to UE;

in this embodiment, any existing method may be used to map the ePDCCHs into a corresponding search space.

Embodiment 20

Figure 19:
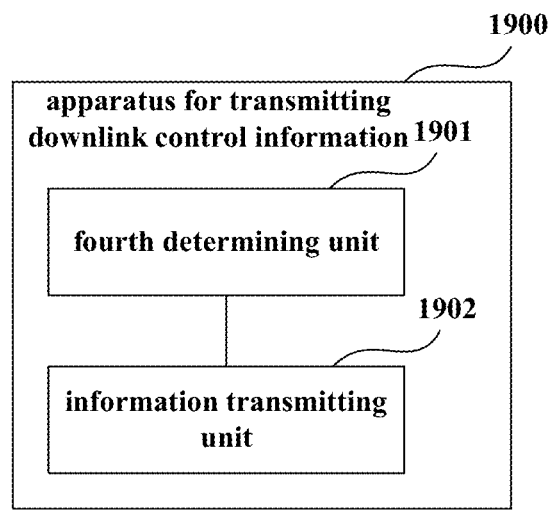
FIG. 19 is a schematic diagram of a structure of an apparatus for transmitting downlink control information of Embodiment 20 of the present disclosure.

FIG. 19 is a schematic diagram of a structure of an apparatus for transmitting downlink control information of Embodiment 20 of the present disclosure. As shown in FIG. 19, the apparatus 1900 includes: a fourth determining unit 1901 and an information transmitting unit 1902; wherein, the fourth determining unit 1901 is configured to determine a search space of ePDCCHs, with a method for determination being as those described in the above embodiments 1 and 3-11, and the structure of the fourth determining unit being as the apparatus as described in the above embodiments 2 and 12-18; and the information transmitting unit 1902 is configured to map the ePDCCHs into the search space and transmit to UE.

It can be seen from above that the network side may map the ePDCCHs into a corresponding search space, so that the UE detect in the search space. Wherein, the search space may be determined by using the methods described in embodiments 1 and 3-11 of the present disclosure.

Embodiment 21

Embodiment 21 of the present disclosure further provides a method for detecting downlink control information, including: detecting enhanced physical downlink control information in a search space; wherein the search space is determined by using the method as described in embodiments 1 and 3-11, which is as described in the above embodiments, and shall not be described herein any further.

Embodiment 22

Figure 20:
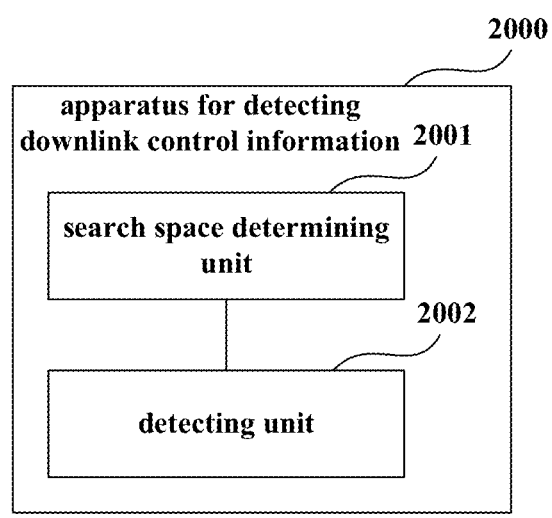
FIG. 20 is a schematic diagram of a structure of an apparatus for detecting downlink control information of Embodiment 22 of the present disclosure.

FIG. 20 is a schematic diagram of a structure of an apparatus for detecting downlink control information of Embodiment 22 of the present disclosure. The apparatus 2000 includes: a search space determining unit 2001 and a detecting unit 2002; wherein, the search space determining unit 2001 is configured to determine a search space of an ePDCCH information; wherein any one of the methods described in embodiments 1 and 3-11 may be used for determination, which shall not be describe herein any further; furthermore, the structure of the search space determining unit 2001 is as those of the apparatuses described in embodiments 2 and 12-18, which shall not be describe herein any further; and the detecting unit 2002 is configured to detect an ePDCCH in the search space.

It can be seen from the above embodiment that in the case of cross-carrier, in determining the search space of the ePDCCHs, an algorithm in the prior art may be simplified (as described in Embodiment 1); or the first offset and the second offset may further be introduced to avoid the ePDCCH candidates between the CCs from colliding, and avoid the ePDCCH candidates in each CC from falling into the same eREG, thereby solving the problem existed in the prior art (as described in embodiments 3-11).

It can be seen from above that UE may detect in the determined search space. Wherein, the methods described in embodiments 1 and 3-8 of the present disclosure may be used to determine the search space.

Embodiment 23

Embodiment 23 of the present disclosure further provides an base station, including the apparatus as described in Embodiment 20.

Embodiment 24

Embodiment 24 of the present disclosure further provides UE, including the apparatus as described in Embodiment 22.

Embodiment 25

Embodiment 25 of the present disclosure further provides a communication system, including the base station as described in Embodiment 23 and the UE as described in Embodiment 24.

Embodiment 26

Embodiment 26 of the present disclosure further provides a base station, including the apparatus as described in embodiments 12-18.

Embodiment 27

Embodiment 27 of the present disclosure further provides UE, including the apparatus as described in embodiments 12-18.

Embodiment 28 of the present disclosure further provides a computer-readable program, wherein when the program is executed in an apparatus for determining a search space, a base station or UE, the program enables the computer to carry out the method for determining a search space as described in one of embodiments 1 and 3-11 in the apparatus for determining a search space, the base station or the UE.

Embodiment 29 of the present disclosure further provides a storage medium in which a computer-readable program is stored, wherein the computer-readable program enables the computer to carry out the method for determining a search space as described in one of embodiments 1 and 3-11 in an apparatus for determining a search space or a base station or UE.

Embodiment 30 of the present disclosure further provides a computer-readable program, wherein when the program is executed in an apparatus for transmitting downlink control information or a base station, the program enables the computer to carry out the method for transmitting downlink control information as claimed described in Embodiment 19 in the apparatus for transmitting downlink control information or the base station.

Embodiment 31 of the present disclosure further provides a storage medium in which a computer-readable program is stored, wherein the computer-readable program enables the computer to carry out the method for transmitting downlink control information as described in Embodiment 19 in an apparatus for transmitting downlink control information or a base station.

Embodiment 32 of the present disclosure further provides a computer-readable program, wherein when the program is executed in an apparatus for detecting downlink control information or UE, the program enables the computer to carry out the method for detecting downlink control information as described in Embodiment 22 in the apparatus for detecting downlink control information or the UE.

Embodiment 33 of the present disclosure further provides a storage medium in which a computer-readable program is stored, wherein the computer-readable program enables the computer to carry out the method for detecting downlink control information as described in Embodiment 22 in an apparatus for detecting downlink control information or UE.

It can be seen from the above embodiments that based on the ways of thinking described in Embodiment 3 and taking simplification of standardization and difficulty of achieving into account, unified manners are used for expressions, and when the eCCE resources in an ePDCCH set are capable of accommodating all the ePDCCH candidates in all the CCs, ePDCCH candidates between different CCs are kept not colliding as possible, and ePDCCH candidates in the same CC are avoided from falling into the same eREG, thereby solving the problems in the art in case of cross-carrier.

The above devices and methods of the present disclosure may be implemented by hardware, and may also be implemented by hardware in combination with software. The present disclosure relates to such a computer-readable program that when the program is executed by a logic component, it enables the logic component to implement the devices or constitutional parts as described above, or enables the logic component to implement the methods or steps as described above. The present disclosure relates also to a storage medium for storing the above program, such as a hard disk, a floppy disk, a CD, and flash memory, etc.

The present disclosure is described above in conjunction with the embodiments, however, it will be apparent to those skilled in the art that such description is exemplary only and is not limitative to the protection scope of the present disclosure. Various variations and modifications may be made by those skilled in the art without departing from the principle of the present disclosure, which will fall within the protection scope of the present disclosure.

What is claimed is:

1. A method for determining a search space, comprising:
determining enhanced control channel elements (eCCEs) occupied by enhanced physical downlink control channel (ePDCCH) candidates in each carrier according to an aggregation level of an ePDCCH and a total number of candidates, the number of eCCEs contained in an ePDCCH set and a parameter related to a cell-radio network temporary identifier (C-RNTI) of a user equipment (UE) and a subframe number; wherein following formula is used in calculation:

$$eCCE(m, i) = L\left\{ \left(Y_k + \left\lfloor \frac{m \cdot N_{eCCE}}{L \cdot M} \right\rfloor + n_{CI} \right) \bmod \left\lfloor \frac{N_{eCCE}}{L} \right\rfloor \right\} + i;$$

where, m denotes an ePDCCH candidate index, m=0, ..., M−1, M denotes a total number of candidates needing to be detected by the UE in a blind manner, i=0, 1, ..., L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$=0, 1, ..., $N_{CC}$−1 denotes scheduled carriers, and $N_{CC}$ denotes a total number of the carriers;
wherein component carrier (CC) ePDCCH candidates are consecutively arranged for different CCs and the ePDCCH candidates in each CC are kept being distributed into whole available frequency domain resources.

2. An apparatus for determining a search space, comprising:
a memory configured to store a plurality of instructions; and
processor circuitry coupled to the memory and configured to:
determine enhanced control channel elements (eCCEs) occupied by enhanced physical downlink control channel (ePDCCH) candidates in each carrier according to an aggregation level of an ePDCCH and a total number of candidates, the number of eCCEs contained in an ePDCCH set and a parameter related to a cell-radio network temporary identifier (C-RNTI) and a subframe number of a user equipment (UE); wherein following formula is used in calculation:

$$eCCE(m, i) = L\left\{ \left(Y_k + \left\lfloor \frac{m \cdot N_{eCCE}}{L \cdot M} \right\rfloor + n_{CI} \right) \bmod \left\lfloor \frac{N_{eCCE}}{L} \right\rfloor \right\} + i;$$

where, m denotes an ePDCCH candidate index, m=0, ..., M−1, M denotes a total number of candidates needing to be detected by the UE in a blind manner, i=0, 1, ..., L−1 denotes an eCCE index in a candidate with an index of m, L denotes the aggregation level, $Y_k$ denotes a parameter related to the C-RNTI of the UE and the subframe number, $N_{eCCE}$ denotes a total number of eCCEs contained in the ePDCCH set, $n_{CI}$=0, 1, ..., $N_{CC}$−1 denotes scheduled carriers, and $N_{CC}$ denotes a total number of the carriers;
wherein component carrier (CC) ePDCCH candidates are consecutively arranged for different CCs and the ePDCCH candidates in each CC are kept being distributed into whole available frequency domain resources.

3. A communication system, comprising: a base station which comprises the apparatus as claimed in claim 2, the base station configured to determine a search space of enhanced physical downlink control information and map the enhanced physical downlink control information into the search space and transmit to the UE.

4. The system according to claim 3, wherein the system further comprises the UE, the UE configured to determine a search space of an enhanced physical downlink control channel (ePDCCH) information and detect the ePDCCH information in the search space, wherein the UE comprises an apparatus for determining a search space, wherein the apparatus comprising:
a memory configured to store a plurality of instructions; and
processor circuitry coupled to the memory and configured to:
determine enhanced control channel elements (eCCEs) occupied by ePDCCH candidates in each carrier according to an aggregation level of an ePDCCH and a total number of candidates, the number of eCCEs contained in an ePDCCH set and a parameter related to a cell-radio network temporary identifier (C-RNTI) and a subframe number of UE; wherein following formula is used in calculation:

$$eCCE(m, i) = L\left\{ \left(Y_k + \left\lfloor \frac{m \cdot N_{eCCE}}{L \cdot M} \right\rfloor + n_{CI} \right) \bmod \left\lfloor \frac{N_{eCCE}}{L} \right\rfloor \right\} + i;$$

where, m denotes an ePDCCH candidate index, m=0, ..., M−1, M denotes a total number of candidates needing to be detected by the UE in a blind manner, i=0, 1, ..., L−1 denotes an eCCE index in a candidate with an index of m, L denotes the aggregation level, $Y_k$ denotes a parameter related to the C-RNTI of the UE and the subframe number, $N_{eCCE}$ denotes a total number of eCCEs contained in the ePDCCH set, $n_{CI}$=0, 1, . . . , $N_{CC}$−1 denotes scheduled carriers, and $N_{CC}$ denotes a total number of the carriers;

wherein component carrier (CC) ePDCCH candidates are consecutively arranged for different CCs and the ePDCCH candidates in each CC are kept being distributed into whole available frequency domain resources.

5. An apparatus for determining a search space, comprising:

a memory configured to store a plurality of instructions; and processor circuitry coupled to the memory and configured to:

determine enhanced control channel elements (eCCEs) occupied by enhanced physical downlink control channel (ePDCCH) candidates in each carrier according to a first offset, a second offset and other related parameters;

wherein the first offset denotes an offset of adjusting the eCCEs occupied by ePDCCH candidates in the same carrier in different enhanced resource element groups (eREGs), and the second offset denotes an offset used for coordinating collision occurs among the eCCEs occupied by ePDCCH candidates in different carriers; and the related parameters comprise: an aggregation level of the ePDCCH and a total number of candidates, the number of eCCEs contained in an ePDCCH set, a parameter related to a cell-radio network temporary identifier (C-RNTI) of a user equipment (UE) and a subframe number, and the number of eCCEs contained in each physical resource block pair.

6. The apparatus according to claim 5, wherein the processor circuitry is configured to:

determine the first offset and the second offset.

7. The apparatus according to claim 5, wherein the processor circuitry is configured to determine the eCCEs occupied by ePDCCH candidates in each carrier in a manner as below:

$$eCCE(m, i) = N_{eCCERB}\left\lfloor\frac{A}{N_{eCCERB}}\right\rfloor + L \cdot (P_1 + P_2 + Y_k)\mathrm{mod}\left(\frac{N_{eCCERB}}{L}\right) + i;$$

where, $P_1$ denotes the first offset, and $P_2$ denotes the second offset;

$$A = L\left\{\left(Y_k + \left\lfloor\frac{m \cdot N_{eCCE}}{L \cdot M} + \frac{n_{CI} \cdot N_{eCCE}}{L \cdot M \cdot N_{CC}}\right\rfloor\right)\mathrm{mod}\left\lfloor\frac{N_{eCCE}}{L}\right\rfloor\right\}, \text{ or}$$

$$A = L\left\{\left(Y_k + \left\lfloor\frac{m \cdot N_{eCCE}}{L \cdot M}\right\rfloor + n_{CI}\right)\mathrm{mod}\left\lfloor\frac{N_{eCCE}}{L}\right\rfloor\right\};$$

where, m denotes an ePDCCH candidate index, m=0, . . . , M−1, M denotes a total number of candidates needing to be detected by the UE in a blind manner, i=0, 1, . . . , L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$ denotes scheduled carriers, $n_{CI}$=0, 1, . . . , $N_{CC}$−1, $N_{CC}$ denotes a total number of the carriers, and $N_{eCCERB}$ denotes the number of the eCCEs contained in each physical resource block pair.

8. The apparatus according to claim 7, wherein the first offset $P_1$ is the ePDCCH candidate index m; or the first offset $P_1$ is an index of a physical resource block pair, which is denoted as follows:

$$P_1 = \frac{A - A_{min}}{L} + \left\lfloor\frac{A}{N_{eCCERB}}\right\rfloor;$$

the processor circuitry is configured to determine the eCCEs occupied by ePDCCH candidates in each carrier in a manner as below:

$$eCCE(m, i) = N_{eCCERB}\left\lfloor\frac{A}{N_{eCCERB}}\right\rfloor + L \cdot \left(\frac{A - A_{min}}{L} + \left\lfloor\frac{A}{N_{eCCERB}}\right\rfloor + P_2 + Y_k\right);$$

$$\mathrm{mod}\left(\frac{N_{eCCERB}}{L}\right) + i$$

or, the first offset $P_1$ is an index of a rearranged physical resource block pair, which is denoted as follows:

$$P_1 = \frac{A - A_{min}}{L} + \left\lfloor\frac{A}{N_{eCCERB} \cdot \lceil N \cdot L/N_{eCCERB}\rceil}\right\rfloor;$$

the processor circuitry is configured to determine the eCCEs occupied by the ePDCCH candidates in each carrier in a manner as below:

$$eCCE(m, i) = N_{eCCERB}\left\lfloor\frac{A}{N_{eCCERB}}\right\rfloor +$$

$$L \cdot \left(\frac{A - A_{min}}{L} + \left\lfloor\frac{A}{N_{eCCERB} \cdot \lceil N \cdot L/N_{eCCERB}\rceil}\right\rfloor + P_2 + Y_k\right);$$

$$\mathrm{mod}\left(\frac{N_{eCCERB}}{L}\right) + i$$

where, $A_{min}$ denotes a minimum value of all the A within a range of a physical resource block pair, which is denoted as follows:

$$A_{min} = \min\{A_{n_1}, A_{n_2}, \ldots, A_{n_N}\};$$

$$\mathrm{s.t.} \left\lfloor\frac{A_{n_1}}{N_{eCCERB}}\right\rfloor = \left\lfloor\frac{A_{n_2}}{N_{eCCERB}}\right\rfloor = \ldots = \left\lfloor\frac{A_{n_3}}{N_{eCCERB}}\right\rfloor;$$

where, s.t. denotes being subjected to constraint conditions listed subsequently, and $A_{n_1}$ to $A_{n_N}$ denote all the A that falls within identical physical resource block pairs, indexed from $n_1$ to $n_N$.

9. The apparatus according to claim 7, wherein the second offset $P_2$=$n_{CI}$.

10. The apparatus according to claim 5, wherein the processor circuitry is configured to determine the eCCEs occupied by the ePDCCH candidates in each carrier in a manner as below:

$$eCCE(m, i) = N_{eCCERB}\left\lfloor \frac{A}{N_{eCCERB}} \right\rfloor + L \cdot (P_1 + P_2 + Y_k) \bmod \left( \frac{N_{eCCERB}}{L} \right) + i;$$

$$\text{where, } A = L\left\{ \left( Y_k + \left\lfloor \frac{m \cdot N_{eCCE}}{L \cdot M} \right\rfloor \right) \bmod \left\lfloor \frac{N_{eCCE}}{L} \right\rfloor \right\},$$

$P_1$ denotes the first offset, $P_1=m$; $P_2$ denotes the second offset, $P_2=n_{CI}$;

and m denotes an ePDCCH candidate index, m=0, ..., M−1, M denotes a total number of candidates needing to be detected by the UE in a blind manner, i=0, 1, ..., L−1 denotes an eCCE index in a candidate with an index of m, L denotes the aggregation level, $Y_k$ denotes a parameter related to the C-RNTI of the UE and the subframe number, $N_{eCCE}$ denotes a total number of the eCCEs contained in the ePDCCH set, $n_{CI}$ denotes scheduled carriers, $n_{CI}$=0, 1, ..., $N_{CC}$−1 $N_{CC}$ denotes a total number of the carriers, and $N_{eCCERB}$ denotes the number of the eCCEs contained in each physical resource block pair.

11. A communication system, comprising a base station which comprises the apparatus as claimed in claim 5, the base station configured to determine a search space of enhanced physical downlink control information and map the enhanced physical downlink control information into the search space and transmit to user equipment (UE).

12. The system according to claim 11, wherein the system further comprises the UE, the UE configured to determine a search space of an enhanced physical downlink control channel (ePDCCH) information and detect the ePDCCH information in the search space, wherein the UE comprises an apparatus for determining a search space, the apparatus comprising:

a memory configured to store a plurality of instructions; and processor circuitry coupled to the memory and configured to:

determine enhanced control channel elements (eCCEs) occupied by ePDCCH candidates in each carrier according to a first offset, a second offset and other related parameters;

wherein the first offset denotes an offset of adjusting the eCCEs occupied by ePDCCH candidates in the same carrier in different enhanced resource element groups (eREGs), and the second offset denotes an offset used for coordinating collision occurs among the eCCEs occupied by ePDCCH candidates in different carriers;

and the related parameters comprise: an aggregation level of the ePDCCH and a total number of candidates, the number of eCCEs contained in an ePDCCH set, a parameter related to a cell-radio network temporary identifier (C-RNTI) of UE and a subframe number, and the number of eCCEs contained in each physical resource block pair.

\* \* \* \* \*